US011487180B2

(12) United States Patent
Dionne et al.

(10) Patent No.: US 11,487,180 B2
(45) Date of Patent: Nov. 1, 2022

(54) METASURFACES FOR OPTICAL DETECTION OF TISSUE AND FIBROUS MATERIAL ANISOTROPY

(71) Applicant: The Board of Trustees of the Leland Stanford Junior University, Stanford, CA (US)

(72) Inventors: Jennifer A. Dionne, Menlo Park, CA (US); Lisa V. Poulikakos, San Diego, CA (US); Mark Lawrence, San Francisco, CA (US); David Russell Barton, III, Somerville, MA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 225 days.

(21) Appl. No.: 17/031,340

(22) Filed: Sep. 24, 2020

(65) Prior Publication Data

US 2021/0088819 A1    Mar. 25, 2021

Related U.S. Application Data

(60) Provisional application No. 62/904,778, filed on Sep. 24, 2019.

(51) Int. Cl.
*G02F 1/139*    (2006.01)
*G02B 1/115*    (2015.01)
*G02B 1/113*    (2015.01)
*G02B 1/118*    (2015.01)

(52) U.S. Cl.
CPC ............ *G02F 1/1392* (2013.01); *G02B 1/113* (2013.01); *G02B 1/115* (2013.01); *G02B 1/118* (2013.01)

(58) Field of Classification Search
CPC ......... G02B 1/113; G02B 1/115; G02B 1/118; G02B 1/002; G02B 1/005; G02B 1/007; G02B 5/1809
See application file for complete search history.

(56) References Cited

U.S. PATENT DOCUMENTS 6,165,598 A    12/2000    Nelson

OTHER PUBLICATIONS

Uddin et al., Highly efficient color filter array using resonant Si3N4 gratings, Optics Express vol. 21, No. 10, pp. 12495-12506. (Year: 2013).*
Yang et al., Ultrahighly saturated structural colors enhanced by multipolar-modulated metasurfaces, Nano Lett. vol. 19, pp. 4221-4228 (Year: 2019).*

(Continued)

*Primary Examiner* — Kimberly N. Kakalec
(74) *Attorney, Agent, or Firm* — Lumen Patent Firm

(57) ABSTRACT

A metasurface optical device composed of three stacked dielectric layers which form an anti-reflective structure for wavelengths in a predetermined operational wavelength range within the visible spectrum. The anti-reflective structure contains a rectangular lattice of rhombohedral perturbations that produce guided-mode resonances within the predetermined operational wavelength range. The guided-mode-resonant dielectric metasurface device is capable of detecting by colorimetric readout the presence and orientation of a linearly birefringent anisotropic medium, such as a fibrous tissue, positioned above the stacked dielectric layers.

13 Claims, 15 Drawing Sheets

(56) References Cited

OTHER PUBLICATIONS

Definition of "rhombohedron," Oxford English Dictionary, available at: https://www.oed.com/view/Entry/165327?redirectedFrom=rhombohedron&print. (Year: 2022).*

Musset, A.; Thelen, A. IV Multilayer Antireflection Coatings. Progress in Optics, 1970, 8, 201-237.

Junqueira, L. C. U.; Bignolas, G.; Brentani, R. R. Picrosirius Staining plus Polarization Microscopy, a Specific Method for Collagen Detection in Tissue Sections. Histochem. J. 1979, 11, 447-455.

Schellman, J.; Jensen, H. P. Optical Spectroscopy of Oriented Molecules. Chem. Rev. 1987, 87, 1359-1399.

Bolin, F. P.; Preuss, L. E.; Taylor, R. C.; Ference, R. J. Refractive Index of Some Mammalian Tissues Using a Fiber Optic Cladding Method. Appl. Opt. 1989, 28, 2297.

Wang, S. S.; Magnusson, R. Theory and Applications of Guided-Mode Resonance Filters. Appl. Opt. 1993, 32, 2606-2613.

Ellenbogen, T.; Seo, K.; Crozier, K. B. Chromatic Plasmonic Polarizers for Active Visible Color Filtering and Polarimetry. Nano Lett. 2012, 12, 1026-1031.

Uddin, M. J.; Khaleque, T.; Magnusson, R. Guided-Mode Resonant Polarization-Controlled Tunable Color Filters. Opt. Express 2014, 22, 12307.

King, N. S.; Liu, L.; Yang, X.; Cerjan, B.; Everitt, H. O.; Nordlander, P.; Halas, N. J. Fano Resonant Aluminum Nanoclusters for Plasmonic Colorimetric Sensing. ACS Nano 2015, 9, 10628-10636.

* cited by examiner

*Fig. 5B*          *Fig. 5C*
Localized        Metastasized
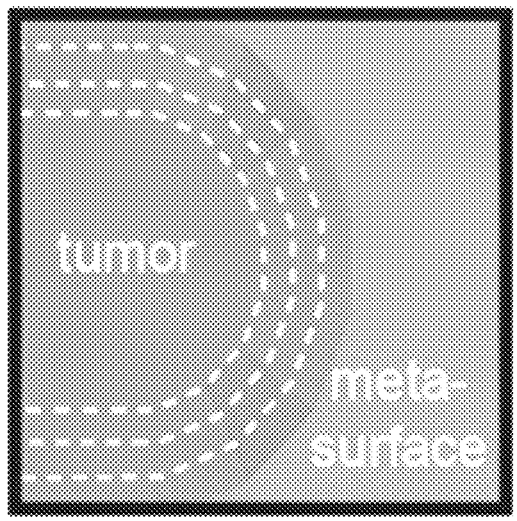 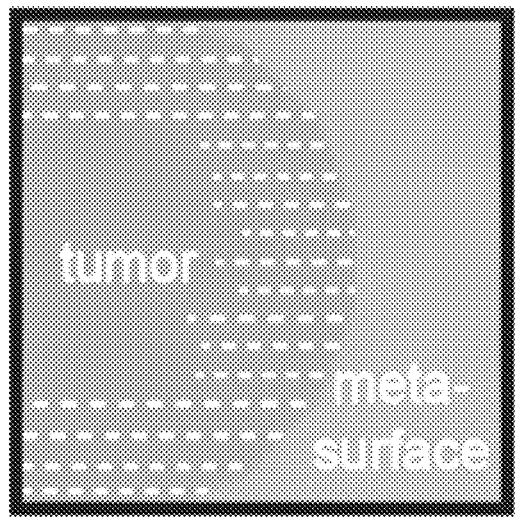
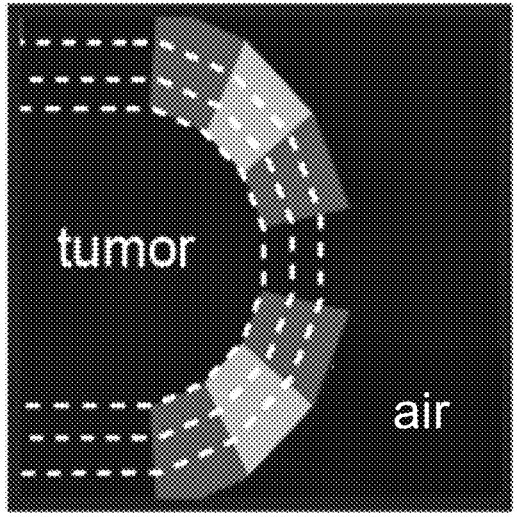 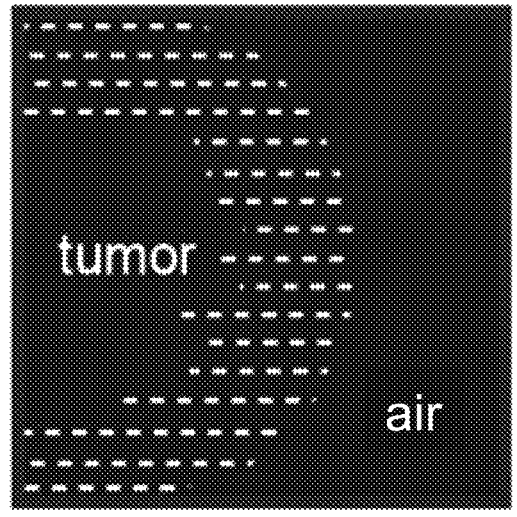
*Fig. 5E*          *Fig. 5F*

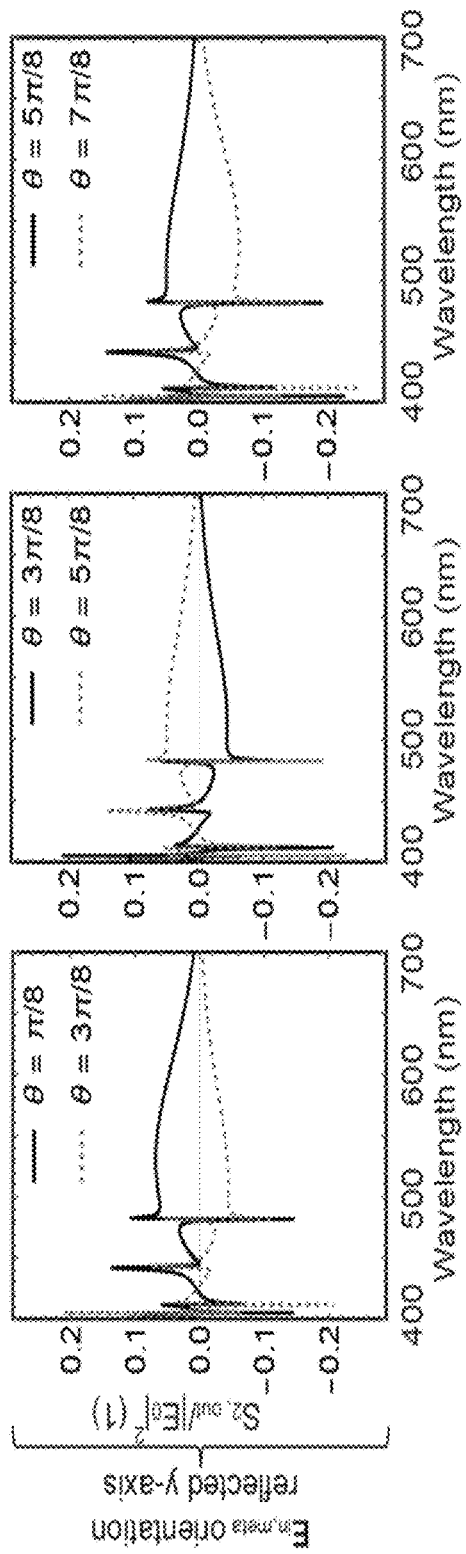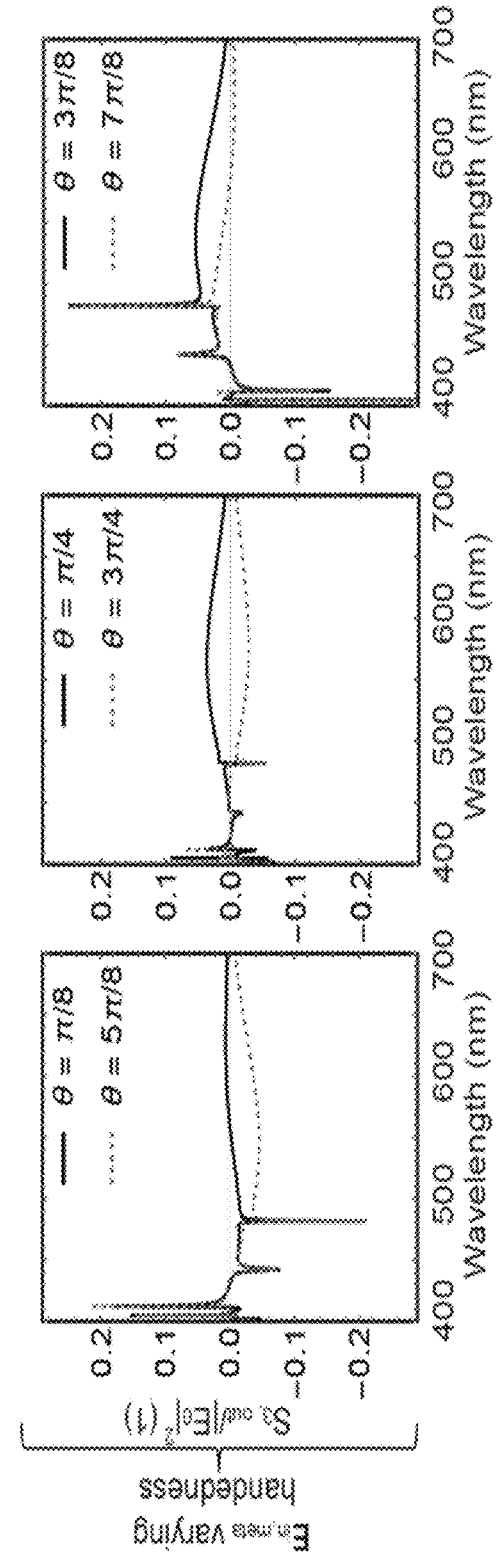

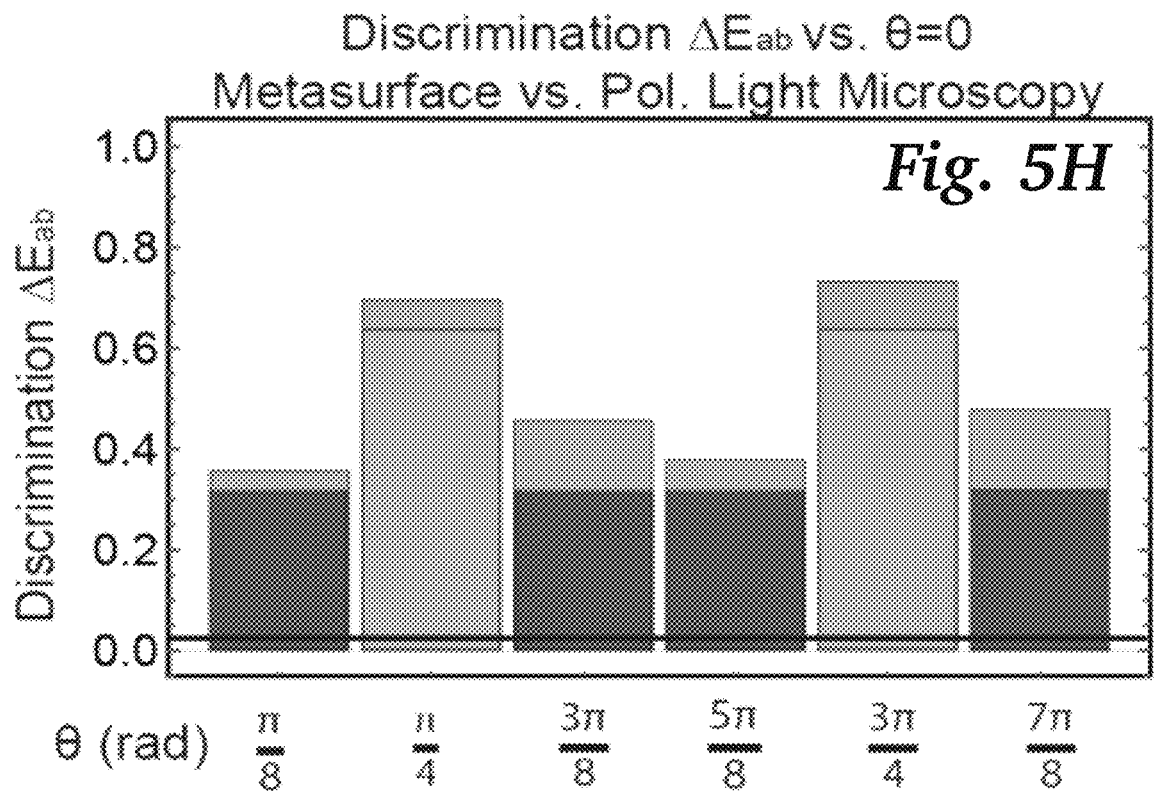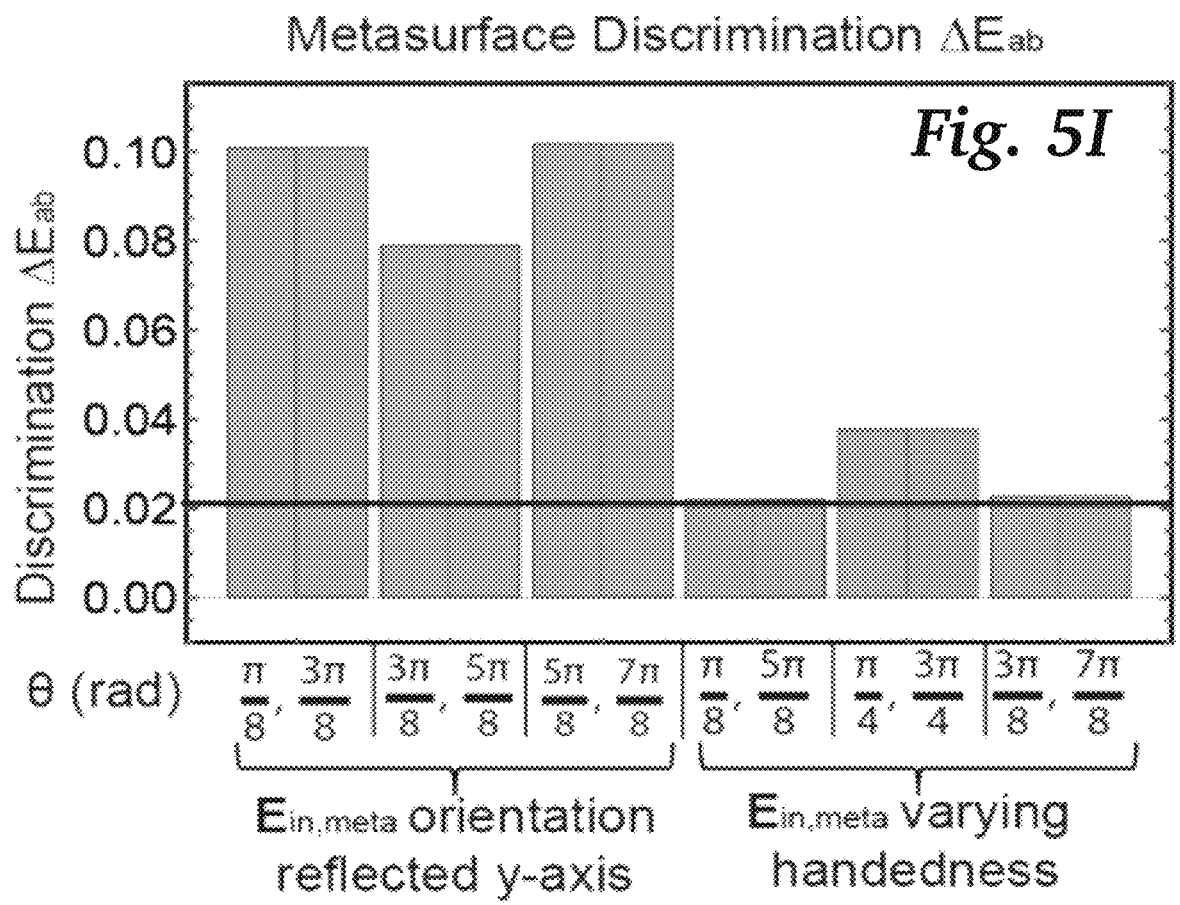

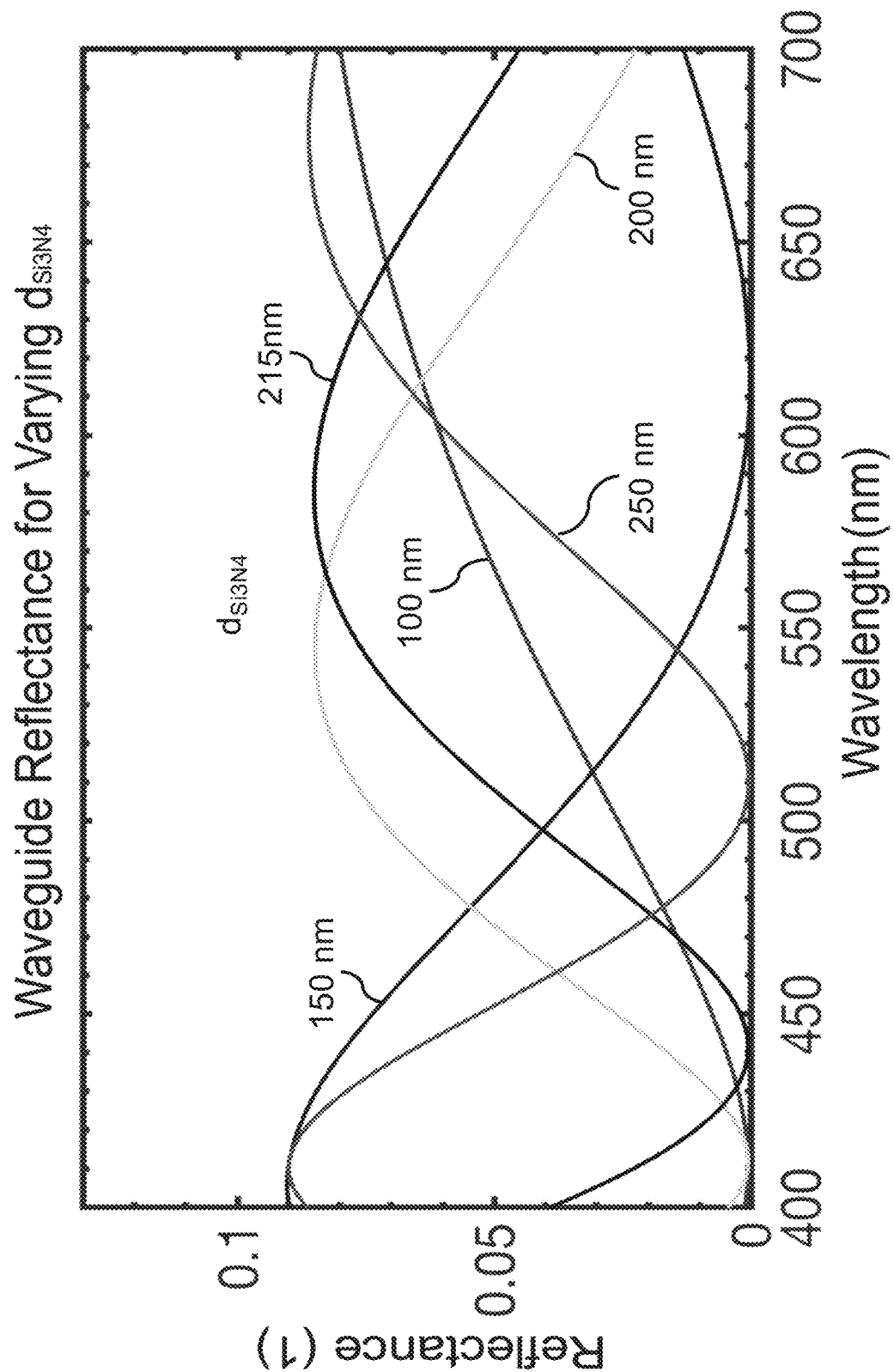

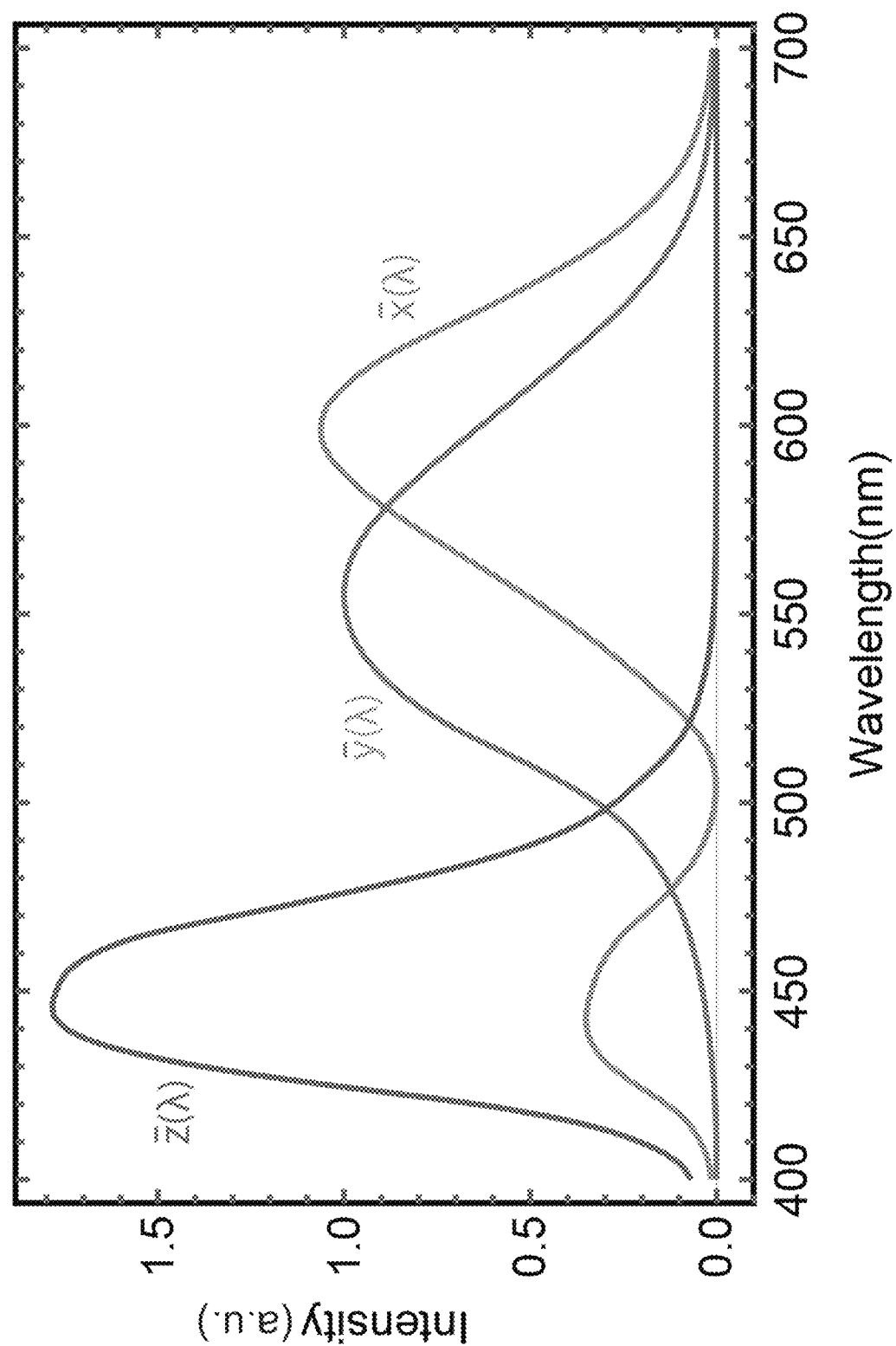

METASURFACES FOR OPTICAL DETECTION OF TISSUE AND FIBROUS MATERIAL ANISOTROPY

CROSS-REFERENCE TO RELATED APPLICATIONS

This application claims priority from U.S. Provisional Patent Application 62/904,778 filed Sep. 24, 2019, which is incorporated herein by reference.

STATEMENT REGARDING FEDERALLY SPONSORED RESEARCH OR DEVELOPMENT

None.

FIELD OF THE INVENTION

The present invention relates generally to optical materials and devices. More specifically, it relates to metasurface optical devices.

BACKGROUND OF THE INVENTION

The structural arrangement of fibrous tissue is linked to the onset and progression of Alzheimer's disease, heart disease, fibrosis and cancer, yet its visualization remains challenging with conventional optical microscopy.

While state-of-the-art optical instrumentation has enabled significant strides in revealing the relationship between fibrous biological tissue and disease, these techniques generally rely on high-power lasers, optoelectronic modulators, or spectrometers that are not readily translatable to the clinic.

BRIEF SUMMARY OF THE INVENTION

Ideally, the above challenges in the state of the art would be addressed by a clinically-translatable imaging technique where quantitative analysis of tissue fiber orientation can be performed in a label-free manner in a simple optical microscope.

To make possible such an imaging technique, the inventors have designed a guided-mode-resonant dielectric metasurface device which is capable of detecting the presence and orientation of fibrous tissue, modelled as a linearly birefringent anisotropic medium, by colorimetric readout. The metasurface has nanoscale layers of dielectrics on a dielectric substrate, acting as a broadband anti-reflection coating, patterned with sub-wavelength-periodic perturbations, which result in guided-mode resonances with narrow bandwidth.

Full-field simulations show how transition from air to tissue in the dielectric environment at the metasurface interface results in a red-to-green change in reflected structural color, while the birefringence and orientation of an anisotropic medium manifests as a green-to-blue change. Importantly, the birefringence-based tuning of the guided-mode resonances is spectrally separated from refractive-index-based displacements, allowing quantitative discrimination between both the index and structural arrangement of anisotropic media.

Numerical simulations of the application of the metasurface to cancer tissue diagnostics demonstrate how changes in reflected structural color at the tumor margin can distinguish localized, early-stage from metastasized, late-stage cancers. The quantitative, colorimetric mapping of tissue orientation angle marks an improved performance in comparison to polarized light microscopy, where multiple orientation angles yield an identical response.

The guided-mode resonant metasurface device thus provides a foundation for all-optical, label-free and quantitative colorimetric visualization of fibrous biological media on a single, clinically-compatible chip, promising improvements in staging and treatment decisions.

In one aspect, the invention provides a metasurface optical device comprising a first layer composed of a first dielectric material, a second layer composed of a second dielectric material, and a third layer composed of a third dielectric material; wherein the first layer, the second layer, and the third layer are stacked to form an anti-reflective structure for wavelengths in a predetermined operational wavelength range within the visible spectrum; wherein the anti-reflective structure contains a rectangular lattice of rhombohedral perturbations that produce guided-mode resonances within the predetermined operational wavelength range. Preferably, each of the rhombohedral perturbations has a size less than wavelengths in the predetermined operational wavelength range. Preferably, the rectangular lattice of rhombohedral perturbations has lattice periodicity less than wavelengths in the predetermined operational wavelength range. Preferably, each of the rhombohedral perturbations breaks reflection and/or rotation symmetry sufficient to induce at least a 10% difference in a colorimetric response of the metasurface optical device within the predetermined operational wavelength range within the visible spectrum compared to a colorimetric response of a device with symmetric perturbations. Preferably, the guided-mode resonances have sub-10 nm bandwidth within the predetermined operational wavelength range.

Preferably, the first dielectric material has a first refractive index, the second dielectric material has a second refractive index, and the third dielectric material has a third refractive index; and the second refractive index is larger than the first refractive index and larger than the third refractive index. Preferably, the first dielectric material, the second dielectric material, and the third dielectric material each have negligible loss (i.e., the imaginary part of the complex refractive index is less than 0.01) within the predetermined operational wavelength range.

Preferably, the anti-reflective structure has a substantially flat spectral background for wavelengths in a predetermined operational wavelength range of the metasurface optical device.

Preferably, the second layer and the third layer each have a thickness less than 1 μm. Preferably, the predetermined operational wavelength range is within the visible spectrum. Preferably, the first layer is a silicon dioxide ($SiO_2$) substrate. Preferably, the second dielectric material is silicon nitride ($Si_3N_4$) or titanium dioxide ($TiO_2$). Preferably, the third dielectric material is silicon dioxide ($SiO_2$).

BRIEF DESCRIPTION OF THE SEVERAL VIEWS OF THE DRAWINGS

FIG. 5B-C schematically illustrates the metasurface colorimetric response for an early-stage, localized cancer and an advanced-stage, metastasized cancer, according to an embodiment of the invention.

FIG. 5E-F is a schematic illustration of the polarized light microscopy colorimetric response for a localized tumor and a metastasized tumor, according to an embodiment of the invention.

FIGS. 5G, 5J-N are graphs illustrating the Stokes parameter analysis of reflected fields from a metasurface-tissue system, according to an embodiment of the invention.

FIG. 5H is a graph of colorimetric discrimination of θ-values off the optical axis in comparison to those on the optical axis for a metasurface and polarized light microscopy, according to an embodiment of the invention.

FIG. 5I is a graph that quantifies how the metasurface can distinguish orientation angles θ of the tissue optical axis which are indistinguishable in polarized light microscopy, according to an embodiment of the invention.

FIG. 6A shows reflectance spectra of stacked dielectric layer waveguide structure for varying layer thicknesses interfaced with isotropic biological tissue, according to an embodiment of the invention.

FIG. 7 shows color matching functions according to CIE colorimetric standards, according to an embodiment of the invention.

DETAILED DESCRIPTION OF THE INVENTION

Metasurfaces, where periodic, sub-wavelength elements are engineered on a single optical chip, allow for the sub-diffraction control and manipulation of light.[30] As metallic, dielectric or hybrid metallo-dielectric composites, metasurfaces can scatter strong structural color.[31-34] Further, when intrinsically anisotropic in their elemental geometry, metasurfaces couple selectively to incident light polarization.[35,36,45-49,37-44] This interaction allows for the quantitative readout of polarization information through metasurface structural color, which has been proposed for a variety of dynamic applications in display or security technology.[36,44,50,51] Metasurfaces have also been employed as highly sensitive detectors,[52] by leveraging the selective interaction between their tailored fields and their refractive-index environment. Thus, spectral shifts have been successfully mapped onto changes in metasurface structural color, allowing for a host of sensing applications for biological and non-biological media.[53-56] Further, when the material components of dielectric metasurfaces exhibit low losses (expressed by the imaginary part of the refractive index) in the spectral range of interest, they can support narrow-bandwidth, high-quality-factor resonances,[57,58] allowing for an efficient, high color-purity spectral response.

The present inventors have combined two prevalent strengths of metasurface systems (i) strong enhancement of sensitivity in the detection of their local environment and (ii) polarization-sensitive colorimetry arising from symmetry breaking in the metasurface elements, to develop a metasurface device that enables quantitative, colorimetric imaging of material anisotropy in ranges directly applicable to fibrous biological media. Importantly, the device spectrally separates (i) and (ii), thus presenting an advantage to several existing colorimetric techniques, where broad-linewidth spectral response[35,42] or concentrated near fields at the metasurface-medium interface[45] convolute the effects of refractive-index and material-anisotropy sensing.

Figure 1A:
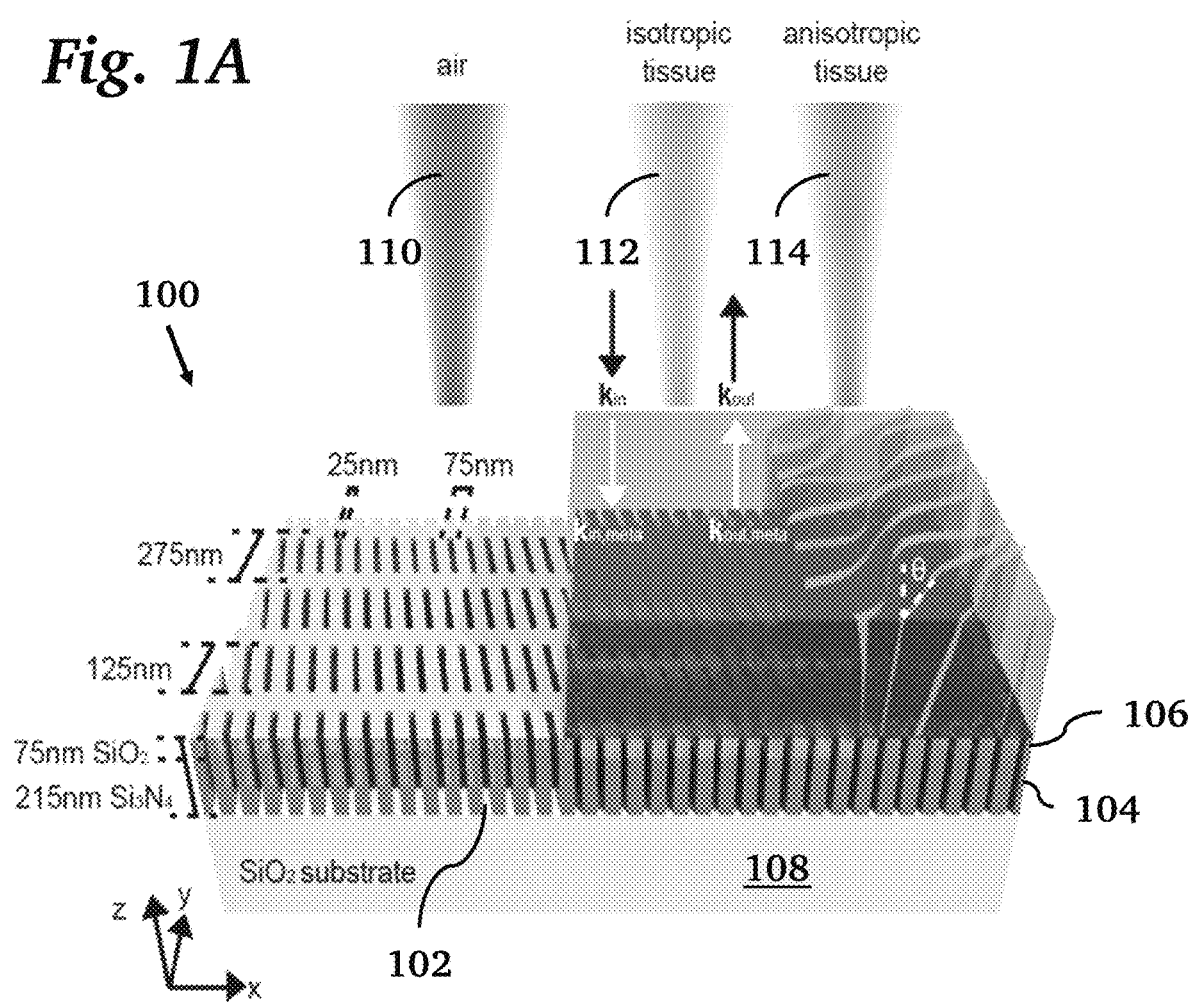
FIG. 1A is a perspective view of a guided-mode-resonant dielectric metasurface device, according to an embodiment of the invention.

As shown in FIG. 1A, a guided-mode-resonant (GMR) dielectric metasurface device 100 according to one embodiment of the invention is composed of a sub-wavelength rectangular lattice of rhombohedral perturbations 102, patterned into nanoscale layers of silicon nitride ($Si_3N_4$) 104 and silicon dioxide ($SiO_2$) 106 on a $SiO_2$ substrate 108. By harnessing their waveguiding properties, these engineered dielectric layers act as an antireflective coating across visible frequencies. Upon broadband illumination, the metasurface geometry then allows for the controlled leakage of narrow-bandwidth (<10 nm) guided-mode resonances in reflectance.

The metasurface device can be fabricated with electron-beam lithography. More cost-effective large-scale-compatible fabrication techniques such as immersed laser interference lithography can also be considered for future applications.

To demonstrate its capabilities as a colorimetric refractive-index sensor, due to spectral displacement, full-field numerical simulations are used to interface the metasurface with an isotropic medium. For this, we obtain red-to-green colorimetry when transitioning from air (relative electric permittivity $\varepsilon_{air}=1$) to biological tissue ($\varepsilon_{tissue}=2$)[59,60] at the metasurface interface. We then demonstrate how the tissue interaction of our metasurface with fibrous biological tissue of varying anisotropy and orientation is encoded in a high-purity blue-to-green colorimetric response arising from controlled, quantitative tuning and detuning of the guided-mode resonances. Finally, we numerically simulate the application of our metasurface to cancer tissue diagnostics, where the arrangement and presence of collagen fibers is quantitatively mapped onto reflected structural color, and analyze its superior performance in comparison to polarized light microscopy.

FIG. 1A illustrates the imaging technique enabled by our GMR dielectric metasurface 100. The metasurface in this embodiment has a stacked dielectric layer with 215 nm $Si_3N_4$ layer 104 and 75 nm $SiO_2$ layer 106 on a $SiO_2$ substrate 108. Sub-wavelength rhombohedral perturbations 102 of 25×125 nm along the x- and y-axes are patterned into the $Si_3N_4$ and $SiO_2$ layers with 75×275 nm lattice periodicity. Upon broadband y-polarized excitation in air ($\varepsilon_{air}=1$), the metasurface reflects a red structural color 110. When interfaced with an isotropic biological tissue section ($\varepsilon_{tissue}=2$), a green reflectance 112 is seen. When interfaced with a fibrous biological tissue section modeled as a linearly birefringent medium with $\Delta n=0.003$, $d=75$ μm and optical axis orientation at $\theta=\pi/4$ with respect to y, our metasurface reflects a blue structural color 114. $k_{in}$, $k_{in,meta}$, $k_{out}$ and $k_{out,meta}$ represent the wavevectors of the incident and reflected light.

The incident electric field is denoted by $E_{in}$, while, after traversing the tissue, $E_{in,meta}$ denotes the electric field incident on the metasurface which varies in its polarization state due to material anisotropy of the tissue sample. The corresponding wavevectors are shown in FIG. 1A as $k_{in}$ and $k_{in,meta}$, while $k_{out}$ and $k_{out,meta}$ represent the reflected wavevectors. Upon y-polarized broadband illumination, our metasurface exhibits capability to quantitatively detect and distinguish both the material and, in the case of a uniaxially-arranged fibrous sensing medium, the fiber orientation θ, by colorimetric image analysis in a simple, clinically available optical microscope.

Figure 1B:
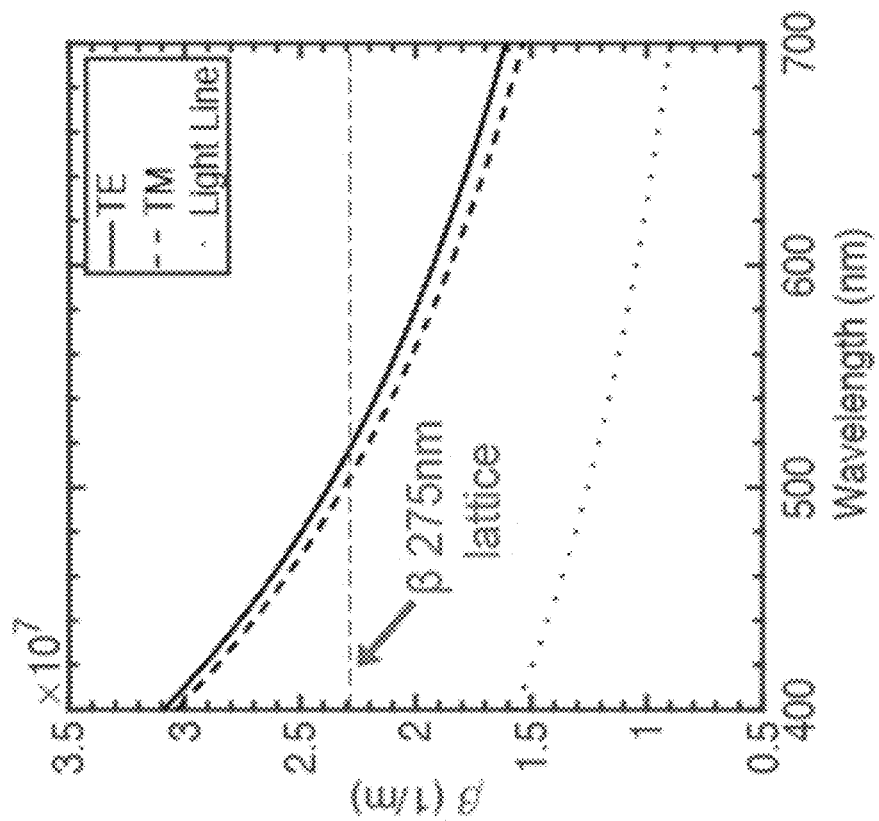
FIG. 1B is a graph of a reflectance spectrum of unpatterned stacked dielectric layers interfaced with tissue, according to an embodiment of the invention.

The material basis of the dielectric metasurface, modeled in COMSOL Multiphysics 5.3a, employs the physics of anti-reflection coatings,[61] where reflectance is inhibited by a sub-wavelength waveguide layer embedded in lower-refractive-index media.[62] Dispersion engineering, discussed in further detail below, results in dielectric layers of silicon nitride ($Si_3N_4$) with thickness $d_{Si_3N_4}=215$ nm and silicon dioxide ($SiO_2$) with thickness $d_{SiO_2}=75$ nm, on a $SiO_2$ substrate, where FIG. 1B indicates the resulting reflectance spectrum of the unpatterned stacked dielectric layers (shown schematically in the inset) interfaced with $\varepsilon_{tissue}=2$.

Figure 1C:
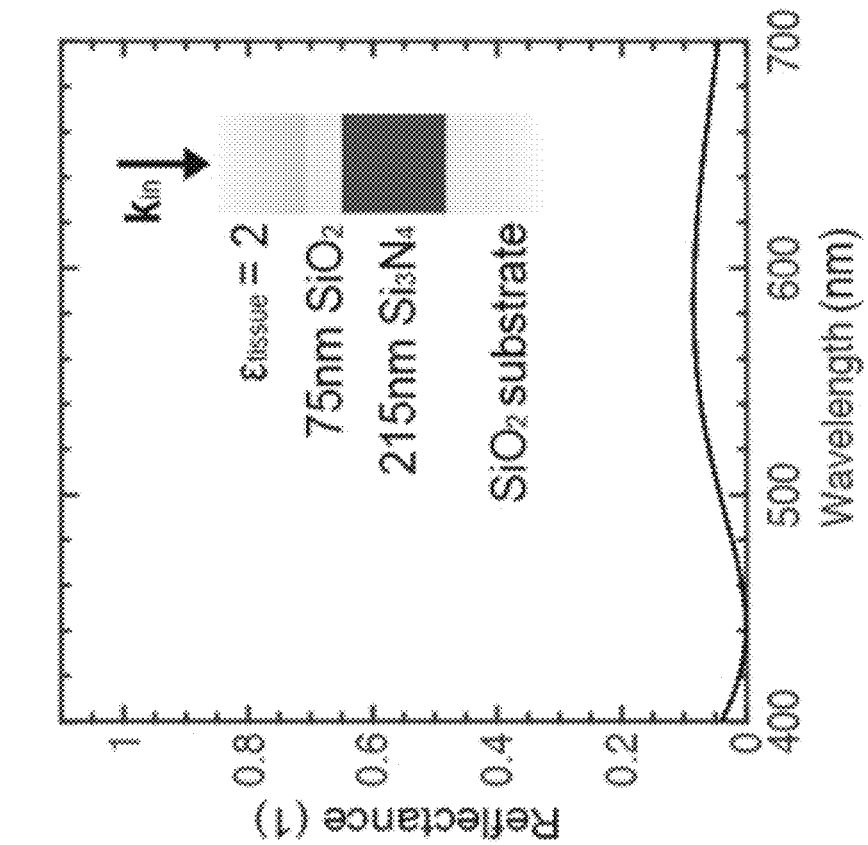
FIG. 1C is a dispersion relation graph showing the first order TE and TM modes of unpatterned stacked dielectric layers, according to an embodiment of the invention.

FIG. 1C shows a dispersion relation showing the first order TE (solid) and TM (dashed) modes of the unpatterned stacked dielectric layers with 215 nm $Si_3N_4$ and 75 nm $SiO_2$ on a $SiO_2$ substrate, with the light line (dotted). The propagation constant β for the lattice periodicity of 275 nm is indicated as a horizontal line (dashed).

When used for imaging, the layered structure is interfaced with a dielectric environment representing that of biological tissue[59,60] with relative electric permittivity $\varepsilon_{tissue}=2$. Note that comparable optical properties with sufficient refractive index contrast can be achieved with a range of low-loss dielectric materials.[61] The dispersion relation serves as a guide to determine the lowest-order GMR frequency, where sub-wavelength lattice periodicities circumvent diffractive coupling.[63,64] In particular, the dashed horizontal line in FIG. 1C indicates β for the 275-nm-periodicity for the illustrative embodiment.

Figures 2A, 2B:
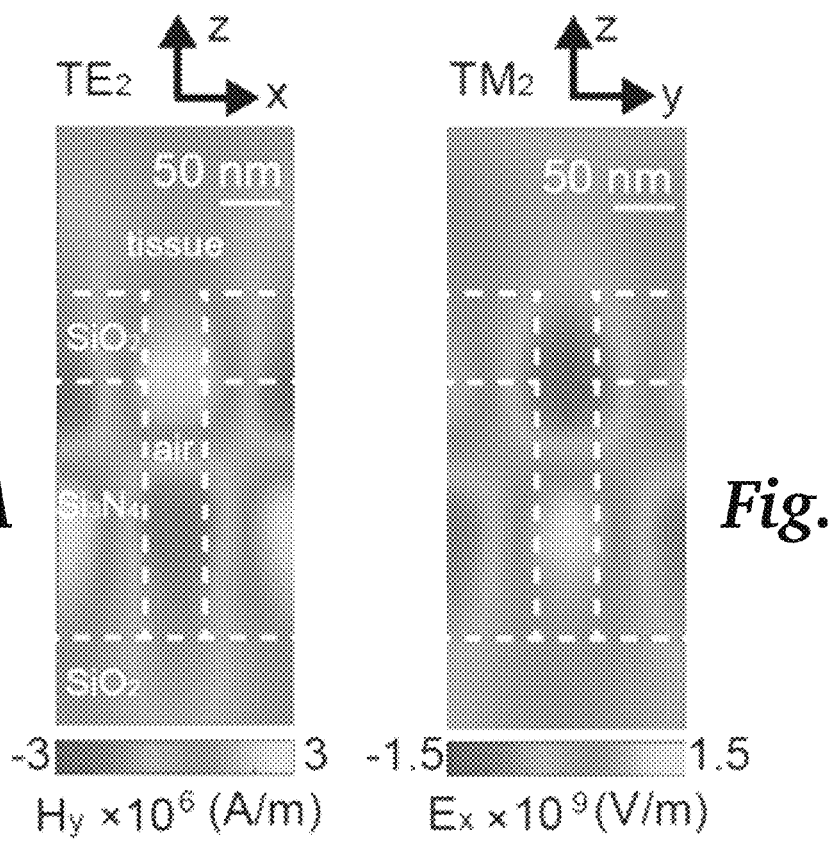
FIG. 2A-D are out-of-plane electric (E) and magnetic (H) field profiles at metasurface guided-mode resonances, according to an embodiment of the invention.
Figures 2C, 2D:
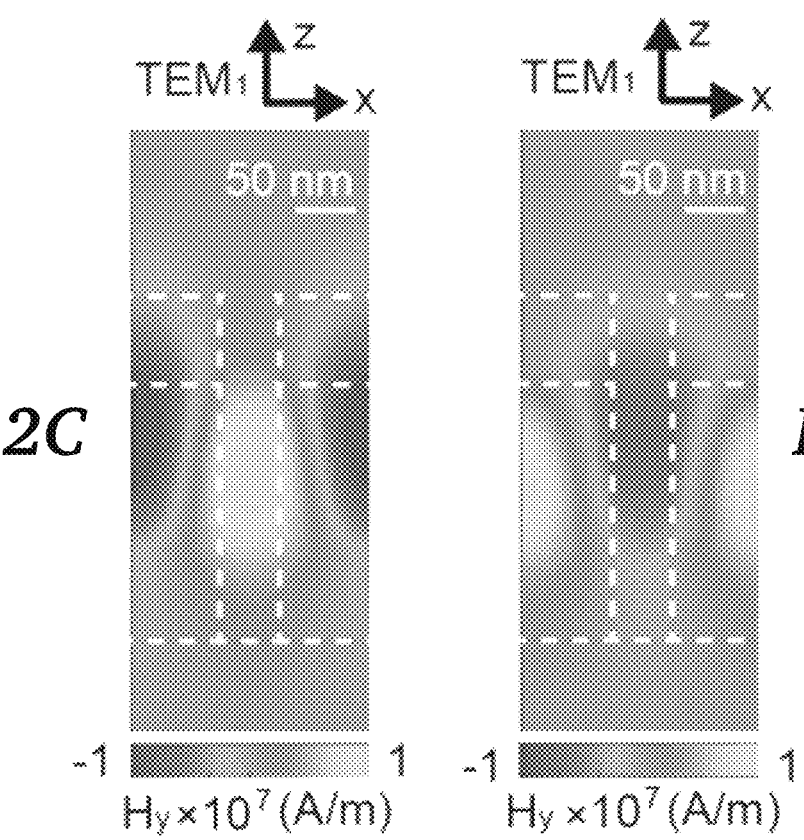
Figure 2E:
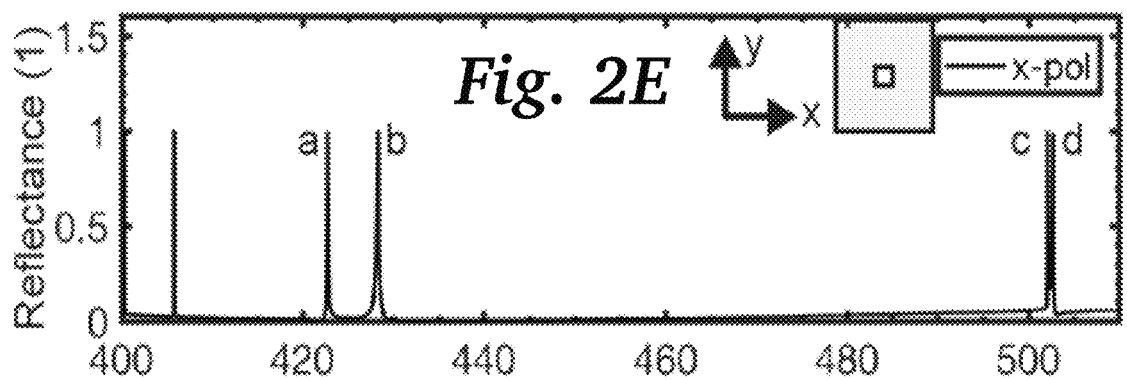
FIG. 2E-H are reflectance spectra of metasurfaces with different perturbation and lattice structures, according to an embodiment of the invention.

The metasurface is designed by introducing sub-wavelength-periodic perturbations to the stacked dielectric layer. The resulting leaky waveguide modes out-couple guided-mode resonances (GMRs) at engineered frequencies.[65] First, we consider a 50×50 nm perturbation, extending into the full depth of the sub-wavelength $Si_3N_4$ and $SiO_2$ dielectric layers, with 275×275 nm periodicity. FIG. 2A-D show out-of-plane electric (E) and magnetic (H) field profiles at the metasurface guided-mode resonances in the corresponding reflectance spectrum (FIG. 2E). The inset of FIG. 2E illustrates a cross-section of a metasurface unit cell in the x-y plane. Due to weak waveguide-mode-modulation arising from the 50×50 nm perturbation,[66] the out-coupled guided-mode resonances in FIG. 2A-B can be assigned to second order TE and TM modes, while the resonances in FIG. 2C-D are attributed to first-order mixed TEM modes.

Figure 2F:
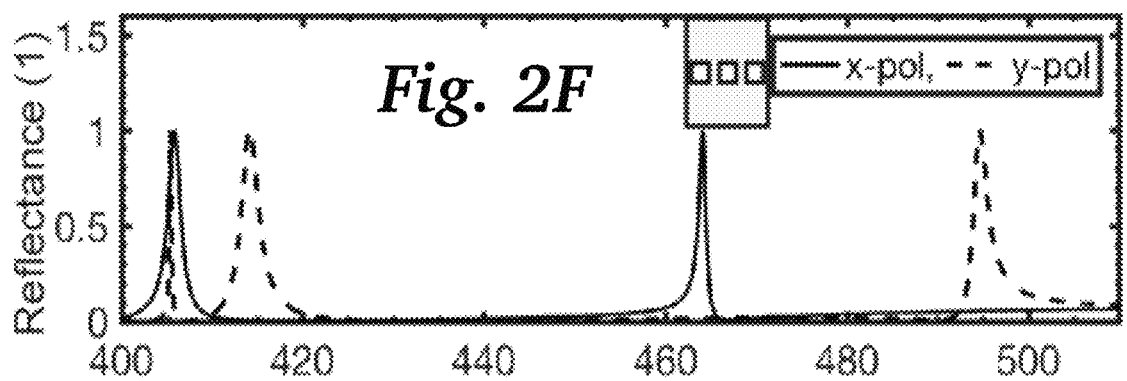
Figure 2G:
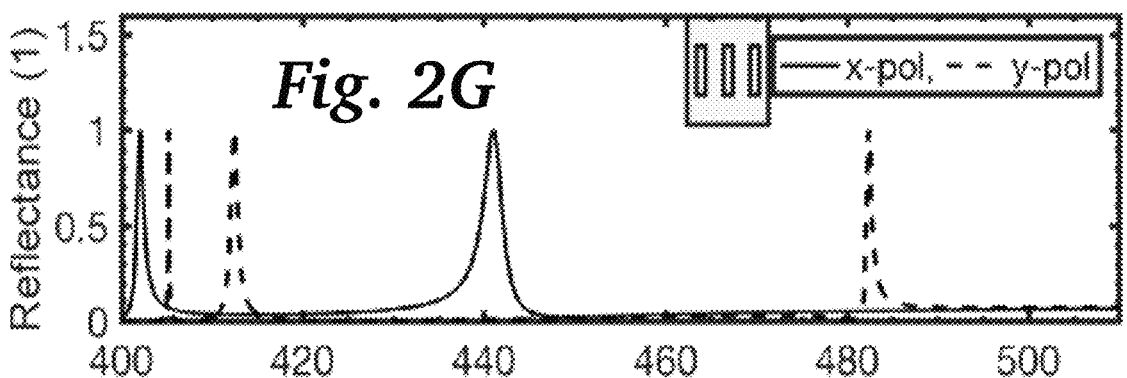
Figure 2H:
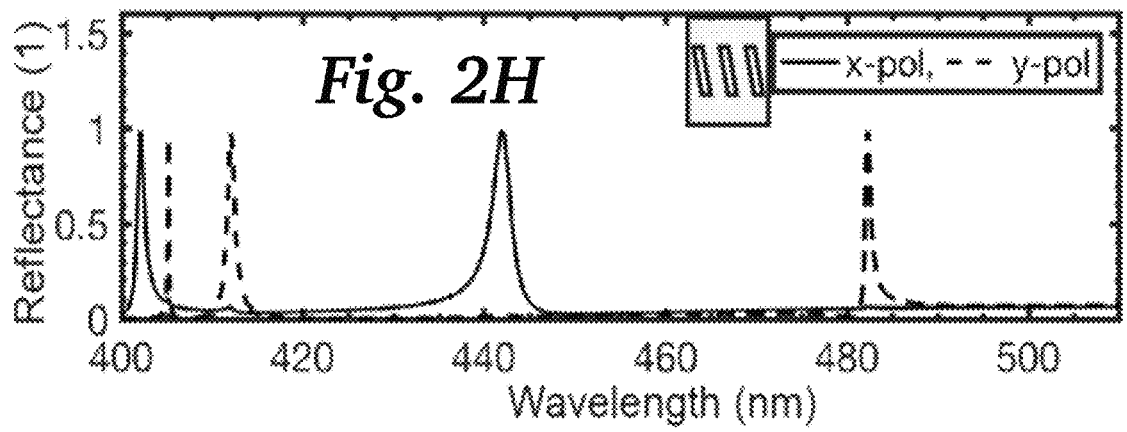
Figure 2I:
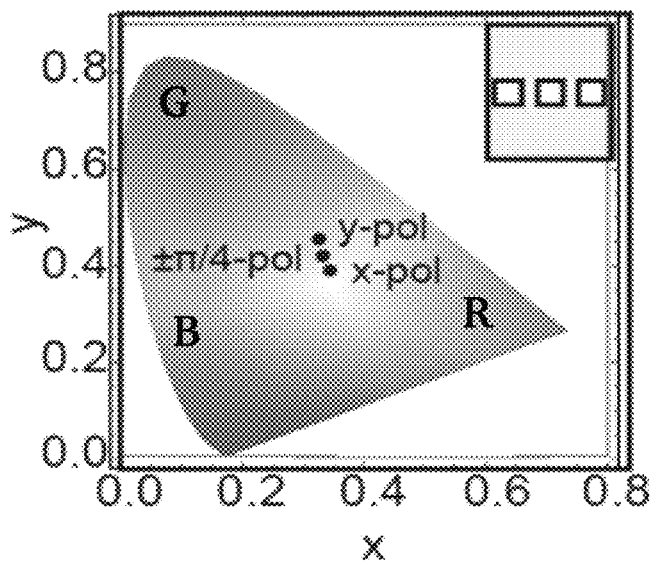
FIG. 2I-K show CIE chromaticity diagrams of the reflected structural color with different perturbation and lattice structures, according to an embodiment of the invention.
Figure 2J:
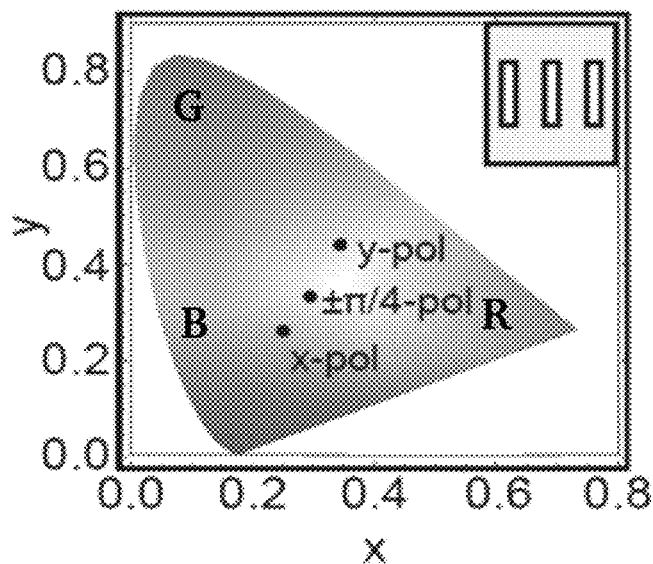
Figure 2K:
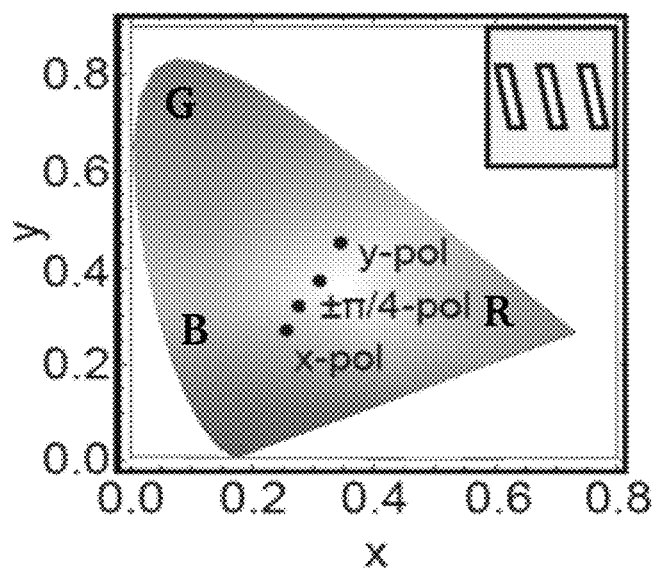

FIG. 2E shows a reflectance spectrum of the metasurface studied in FIG. 2A-D, where GMRs of corresponding field profiles are marked accordingly. Due to $C_4$-symmetry of the lattice and perturbation element, x- and y-polarized excitation yield identical reflectance spectra. FIG. 2F-H shows reflectance spectra of metasurfaces with 50×50 nm perturbation in a 75×275 nm lattice (FIG. 2F), 25×125 nm perturbation in a 75×275 nm lattice (FIG. 2G) and a rhombohedral perturbation with 25 nm in x-direction, 125 nm in y-direction in a 75×275 nm lattice (FIG. 2H). Solid lines denote x-polarized excitation, while dashed lines denote y-polarized excitation for axes as shown in the inset of FIG. 2E. FIG. 2I-K show CIE chromaticity diagrams of the reflected structural color for x-, y- and ±π/4-polarized excitation for metasurfaces with a 50×50 nm perturbation (FIG. 2I), a 25×125 nm perturbation (FIG. 2J), and a rhombohedral perturbation with 25 nm in x-direction, 125 nm in y-direction (FIG. 2K) in a 75×275 nm lattice.

While narrow spectral linewidths of the metasurface GMRs present advantages of high color purity and mode contrast for the targeted diagnostic application, the GMR spectral bandwidth must exceed ca. 5 nm to out-couple an easily observable colorimetric response.[45,46] Spectral broadening of the metasurface reflectance presented in FIG. 2D can be achieved by higher waveguide modulation, i.e. increasing the number of perturbations or their spatial extent, which in turn can result in GMRs arising from mixed waveguide modes (e.g. resonances c, d in FIG. 2E).[66] This is seen in FIG. 2F, where the waveguide modulation is increased by embedding the 50×50 nm perturbation in a 75×275 nm lattice (see inset). Further, the uniaxial symmetry breaking of the waveguide modulation yields two spectrally distinct GMRs resulting from a given waveguide mode upon x- or y-polarized excitation (axes as noted in the inset of FIG. 2E), shown as solid or dashed lines, respectively. To further improve polarization-dependent spectral tunability of the metasurface, in FIG. 2G the spectral separation of the GMRs arising from x- and y-polarized excitation was increased by introducing a rectangular 25×125 nm perturbation to the 75×275 nm lattice (see inset for metasurface cross section). While increasing the size and periodicity of the perturbations leads to desired spectral-broadening and symmetry-breaking effects, the resulting decrease in the effective refractive index of the leaky waveguide system additionally spectrally blueshifts the GMRs. Transitioning from square to rectangular perturbations in FIG. 2G, we note that the GMRs arising from x-polarized excitation are broadened while those arising from y-polarized excitation are narrowed. This is attributed to the fact that a y-(x-)polarized plane wave experiences a higher modulation of the waveguide modes for the structure displayed in FIG. 2F-G. Finally, FIG. 2H shows the reflectance spectra for a metasurface unit cell element with a rhombohedral geometry matching the aspect ratio of the rectangular perturbation in FIG. 2G (i.e. 25 nm in x-direction, 125 nm in y-direction axes as in the inset of FIG. 2E).

We now illustrate how the systematic planar symmetry-breaking of the metasurface unit cell element and lattice shown in FIG. 2F-H broaden the range of polarization-tunable reflected structural colors. Following CIE colorimetric standards,[54,67,68] FIG. 2I-K show the observed reflected structural color, quantified as the chromaticity, computed in Mathematica, for varying metasurface geometries, embedded in a 75×275 nm rectangular lattice. The metasurface unit-cell lattice exhibits $C_2$ rotational symmetry, where $C_n$ rotational symmetry maps a shape onto itself upon planar rotation of $$\frac{2\pi}{n}.$$

The reflected metasurface chromaticity is mapped for linearly polarized incident light with varying polarizations oriented along x-, y- and $$\pm\frac{\pi}{4}.$$

The 50×50 nm square and 25×125 nm rectangular metasurface unit cell elements shown in the inset of FIG. 2I-J exhibit $C_4$ and $C_2$ rotational symmetries, respectively. As indicated in the corresponding reflectance spectra (FIG. 2F-G) the $C_2$-symmetric rectangular perturbation yields larger spectral differences between x- and y-polarized excitation than the $C_4$-symmetric square perturbation. This polarization-tunability of the metasurface reflectance affects the chromaticity. Indeed, the range of chromaticity reached by the rectangular metasurface unit cell element (FIG. 2J) clearly exceeds that resulting from the square metasurface unit cell element (FIG. 2I). Note that due to the reflective symmetry of the systems shown in FIG. 2I-J, $$\pm\frac{\pi}{4}$$

polarized incident light results in identical reflectance spectra and a single chromaticity. Consequently, FIG. 2K shows that by breaking reflective symmetry of the metasurface unit cell element with a rhombohedral geometry, each incident linear polarization ranging from 0-π will yield a unique chromaticity. We focus on this rhombohedral metasurface geometry for our diagnostic results below.

The targeted diagnostic application aims to exploit the anisotropic optical properties of uniaxially-arranged ordered structural proteins within the tissue, where e.g. collagen arises most frequently in the human body.[69] The anisotropic optical properties of fibrous biological tissue are well-approximated by linear birefringence, where polarized light experiences a distinct phase delay along orthogonal axes.[70] In particular, the fast and slow axes of type I collagen fibers, the most prevalent collagen type and a key component of connective tissue,[71] have been shown to exhibit a change in refractive index of $\Delta n=0.003$.[25-27] From this, the phase delay arising from linear birefringence is related to the tissue thickness, d, as[27,72]

$$\Phi_b = \frac{2\pi}{\lambda}\Delta nd, \quad (1)$$

where λ is the incident electromagnetic wavelength.

Because the near-field effects of the refractive index anisotropy along collagen optical axes ($\Delta n=0.003$), do not significantly alter the metasurface spectral response, we employ Jones formalism,[70] a linear model of far-field light-matter interactions assuming fully polarized light excitation and negligible depolarization, to describe light propagation in the studied fibrous tissue samples. Specifically, the linearly birefringent tissue sample is modeled by the Jones matrix[70]

$$J_{tissue}(\Phi_b, \theta) = \begin{pmatrix} \cos\left(\frac{\Phi_b}{2}\right) + i\sin\left(\frac{\Phi_b}{2}\right)\cos(2\theta) & i\sin\left(\frac{\Phi_b}{2}\right)\sin(2\theta) \\ i\sin\left(\frac{\Phi_b}{2}\right)\sin(2\theta) & \cos\left(\frac{\Phi_b}{2}\right) - i\sin\left(\frac{\Phi_b}{2}\right)\cos(2\theta) \end{pmatrix} \quad (2)$$

for phase delay $\Phi_b$ and θ as the rotation angle of the tissue optical axis. The Jones matrix of the metasurface, $J_{meta}$, is composed of its complex scattering parameters, or S-parameters, extracted from full-field calculations in COMSOL Multiphysics 5.3a, while Jones calculus of the numerical data is performed in Matlab_R2016b. As indicated schematically in FIG. 1A, when a plane wave, with electric field $E_{in}$, enters the tissue, the electric field incident on the metasurface is described by $E_{in,meta}=J_{tissue}(\Phi_b, \theta)\cdot E_{in}$. The reflected electric field exiting the metasurface then becomes $E_{out,meta}=J_{meta}\cdot E_{in,meta}$ and the output electric field is written as $E_{out}=J_{tissue}(\Phi_b, -\theta)\cdot E_{out,meta}$.

Figure 3A:
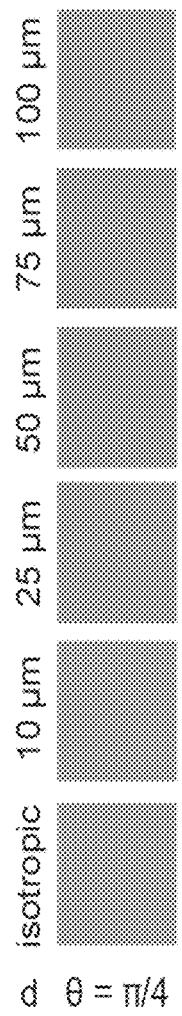
FIG. 3A-C are diagrams demonstrating how different thicknesses of fibrous tissue result in different corresponding colorimetric responses (reflectance spectra) and color discrimination, according to an embodiment of the invention.
Figure 3B:
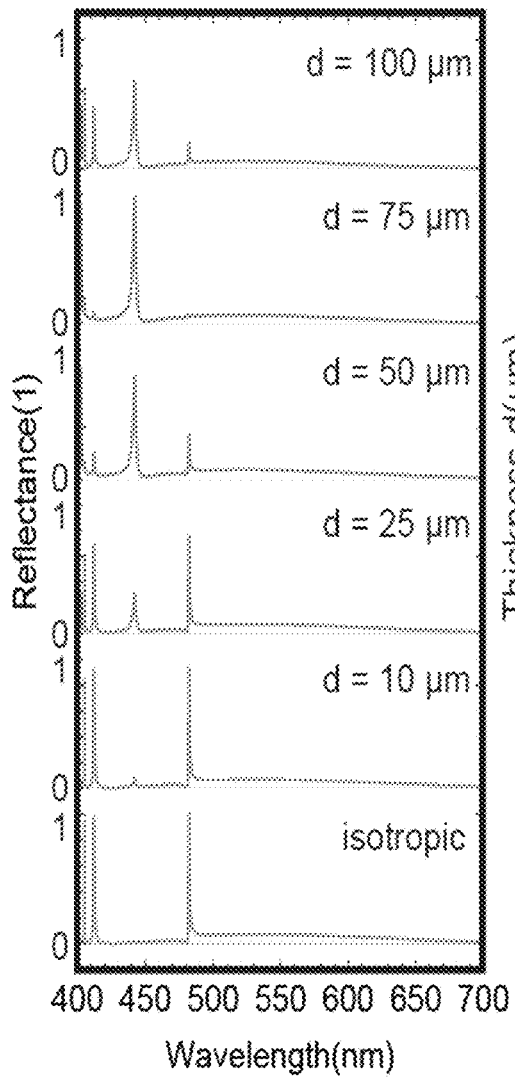
Figure 3C:
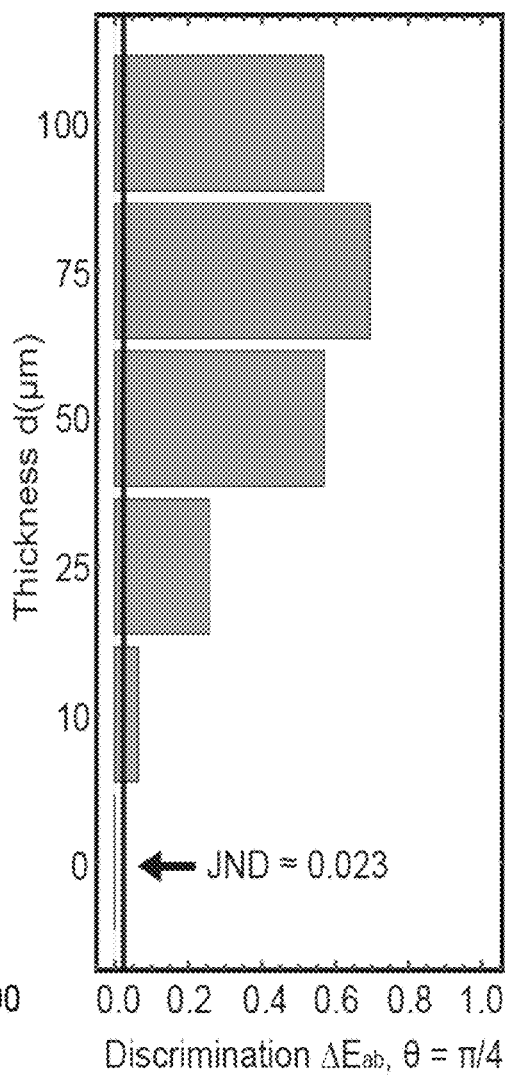

Based on this principle, FIG. 3A-C demonstrates how variations in thickness of the fibrous tissue sample alter the resulting colorimetric response, in comparison to an isotropic tissue sample. For y-polarized plane-wave excitation, $E_{in}=[0, E_0]^T$, the reflected metasurface structural color is shown in FIG. 3A where the tissue thickness, d, is varied along the vertical direction and the tissue optical axis is oriented at $$\theta = \frac{\pi}{4}.$$

This is further demonstrated by the corresponding reflectance spectra in FIG. 3B, where a green-to-blue color transition is attributed to changes in the narrow-bandwidth guided-mode resonances.

FIG. 3A shows reflected structural color from the metasurface interfaced with a linearly birefringent medium, matching the anisotropic optical properties of fibrous biological tissue whose optical axis is oriented at θ=π/4. Thickness of the medium varies from 10 μm-100 μm in the vertical direction. For comparison, bottom row shows the response of an isotropic medium. FIG. 3B shows reflectance spectra of the metasurface-tissue system for varying thickness, where line colors correspond to the reflected structural color shown in FIG. 3A. FIG. 3C shows $\Delta E_{ab}$, the 1976 CIE Lab color discrimination, with respect to the reflected structural color at θ=π/4. The black line denotes the just noticeable difference JND≈0.023, while the largest discrimination is seen at d=75 μm.

This phenomenon is explained by the nature of linear birefringence (eq. 2), where for integers n, $$\theta = \frac{(2n+1)\pi}{4},$$

results in a maximum phase shift between orthogonal components of the incident light as it traverses the medium. For the studied case of y-polarized incident light, $$\theta = \frac{(2n+1)\pi}{4}$$

and $E_{in}=[0, E_0]^T$ results in $$E_{in,meta} = E_0\left[\pm i\sin\left(\frac{\Phi_b}{2}\right), \cos\left(\frac{\Phi_b}{2}\right)\right]^T.$$

For example, for d=75 μm and $$\theta = \frac{\pi}{4},$$

we consider the two GMR wavelengths seen in the corresponding reflectance spectrum (second from the top in FIG. 3B). At the shorter-wavelength GMR, λ=402.11 nm, $\Phi_b=1.12\pi$ and $E_{in,meta}=E_0[0.98i, -0.19]^T$, while for the longer-wavelength GMR we find λ=441.99 nm, $\Phi_b=1.02\pi$ and $E_{in,meta}=E_0[1i, -0.03]^T$. In both example cases, the polarization state of $E_{in,meta}$ closely corresponds to that of x-polarized light ($E_{x-pol}=[E_0, 0]^T$). As shown in the metasurface CIE chromaticity diagram in FIG. 2K, x- and y-polarized incident light result in the largest colorimetric difference arising from changes in the incident polarization state. The 2π-periodicity of $\Phi_b$ (eq. 1) further explains why linearly birefringent media have periodically-reoccurring thicknesses at which a given $E_{in,meta}$ can be obtained.

The ability of the human eye to distinguish the reflected structural color at $$\theta = \frac{\pi}{4}$$

from the corresponding structural color at θ=0, is quantified in FIG. 3C. For this, we convert the obtained chromaticity coordinates from the 1931 CIE xyz color space to the 1976 CIE Lab color space, where L describes the lightness, i.e. the color range between black and white, a describes the color range between green and red and b describes the color range between blue and yellow.[73,74] Importantly, in the 1976 CIE Lab color space, equal changes in chromaticity coordinates are perceived equally by the human eye. This is quantified by $\Delta E_{ab}$, the 1976 CIE Lab color discrimination, which, for two colors with chromaticity coordinates $L_1$, $a_1$, $b_1$ and $L_2$, $a_2$, $b_2$ is defined as[73,74]

$$\Delta E_{ab}=\sqrt{(L_2-L_1)^2+(a_2-a_1)^2+(b_2-b_1)^2}, \quad (3)$$

where $\Delta E_{ab}$ ranges from 0 to 1. The $\Delta E_{ab}$ values in FIG. 3C quantify how for $$\theta = \frac{\pi}{4}$$

the maximum color discrimination is found at d=75 μm, while JND≈0.023 denotes the "just-noticeable difference" distinguishable by the human eye.[73]

Note that the colorimetric response of our metasurface is determined by a far-field effect, i.e. changes in the polarization state of $E_{in,meta}$ due linear birefringence of the tissue, rather than near-field interactions at the tissue-metasurface interface. This presents an advantage in comparison to near-field sensing techniques, where the interaction with exponentially-decaying evanescent fields[75] would be strongly affected by variability in tissue roughness.[76] In contrast to polarized light microscopy, where a sample is imaged between crossed polarizers and $\Delta E_{ab}$ is determined by changes in the lightness L, our metasurface detects the total reflected fields upon polarized light excitation. $\Delta E_{ab}$ is thus additionally determined by changes in a and b, enabling improved color discrimination capabilities.

The dielectric layer structure, from which the guided-mode resonances of our metasurface are extracted, was designed to act as an anti-reflective coating in a material environment of ε=2.

Figure 4A:
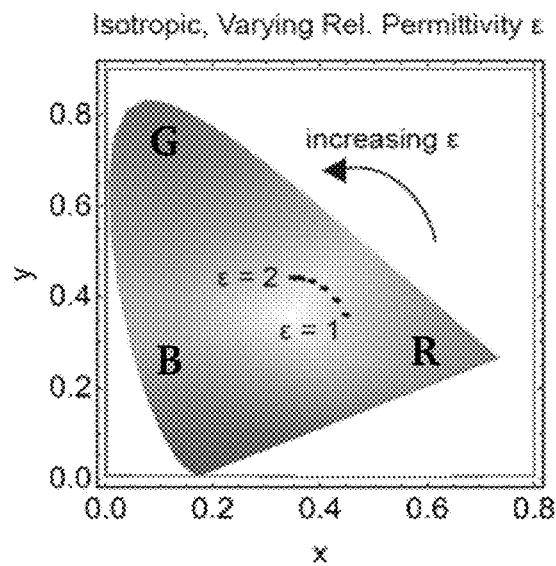
FIG. 4A-C show CIE chromaticity diagram and corresponding reflectance spectra illustrating the ability of the metasurface to act as a colorimetric refractive-index sensor for isotropic media with varying relative permittivity, according to an embodiment of the invention.
Figure 4B:
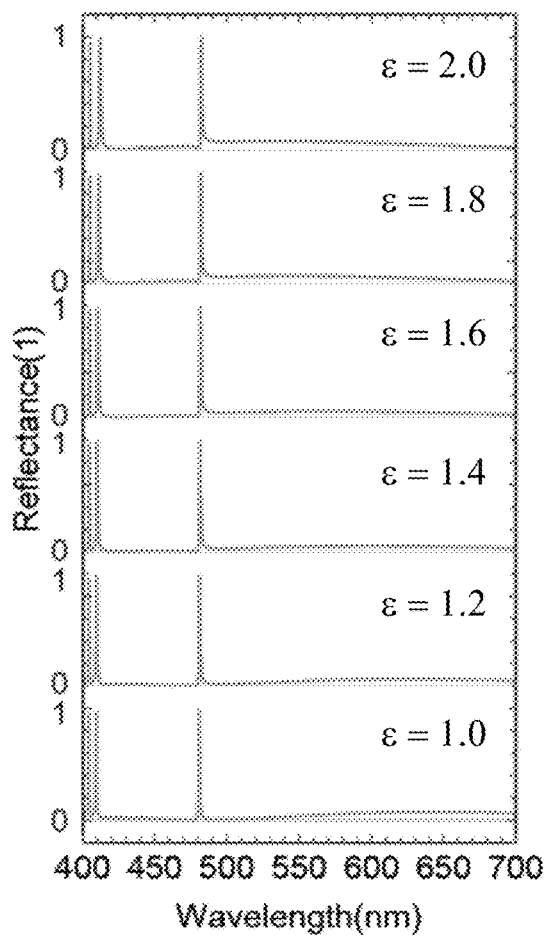
Figure 4C:
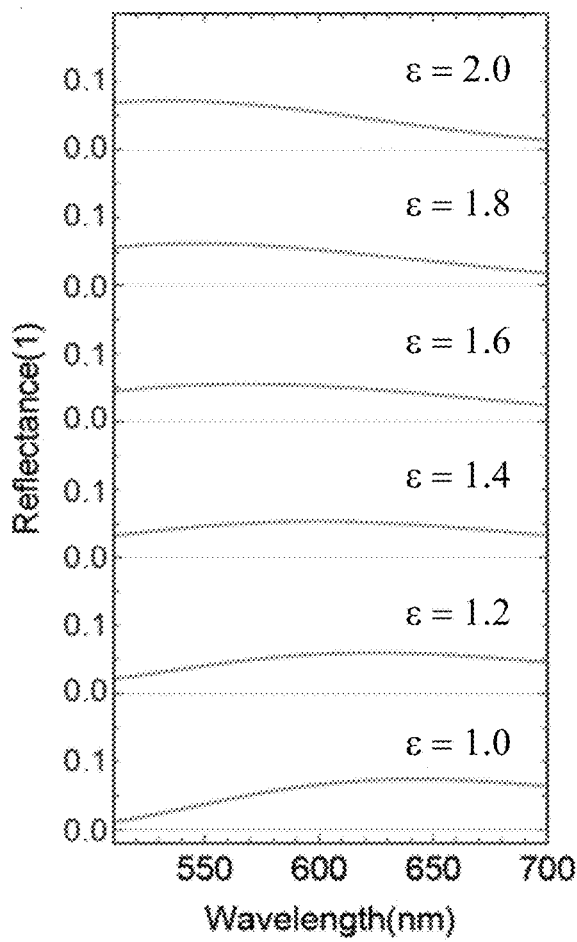

FIG. 4A-C show capabilities of our metasurface to act as a colorimetric refractive-index sensor for isotropic media with varying relative permittivity ε=1:0.2:2. The CIE chromaticity diagram is shown in FIG. 4A, while FIG. 4B and FIG. 4C show the corresponding reflectance spectra, where the insets and line colors correspond to the reflected structural color. FIG. 4C focuses on the longer-wavelength response in FIG. 4B, to which the red-to-green colorimetric transition is attributed.

FIG. 4A shows how, upon y-polarized broadband excitation, changes in the isotropic sensing medium on top of the metasurface enable colorimetric changes from red (for ε=1, corresponding to air) to green as ε=1:0.2:2. Changes in chromaticity for varying ε are shown on the CIE chromaticity diagram (FIG. 4A) and reflectance spectra (FIG. 4B-C). This can be explained by the sensitivity of the anti-reflective properties of the stacked dielectric metasurface layer to the metasurface material environment. Importantly, the strong electromagnetic field localization occurs within the metasurface perturbation, i.e. it does not significantly extend above the metasurface, where the sensing medium is present (see FIG. 2A-D). Thus, the effect of changes in the refractive index of the sensing medium on the metasurface GMRs is negligible (FIG. 4B), while causing significant spectral shifts in the background reflectance at lower frequencies (FIG. 4C). Note that our metasurface presents additional refractive-index-sensing capabilities, e.g. for immersion in liquid media, where the rhombohedral perturbations can act as nanoscale cuvettes and small spectral shifts in the guided-mode resonances can be detected due to their narrow spectral bandwidth.

Figure 4D:
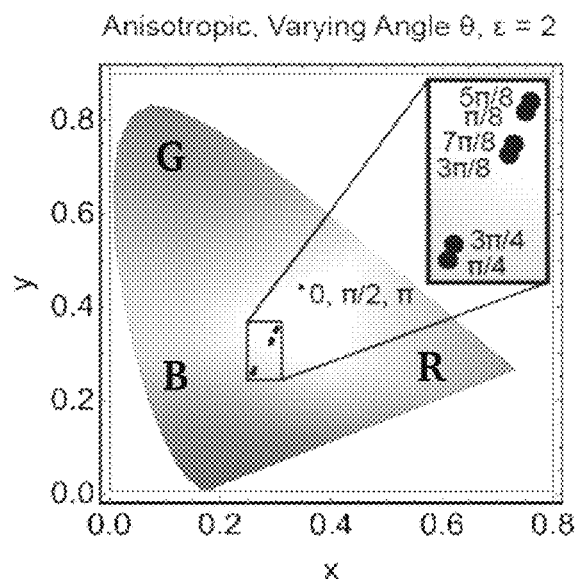
FIG. 4D-F show CIE chromaticity diagram, reflectance spectra, and first Stokes parameter illustrating the ability of the metasurface to act as a colorimetric refractive-index sensor for anisotropic media with varying orientation angle θ of the tissue optical axis, according to an embodiment of the invention.
Figure 4E:
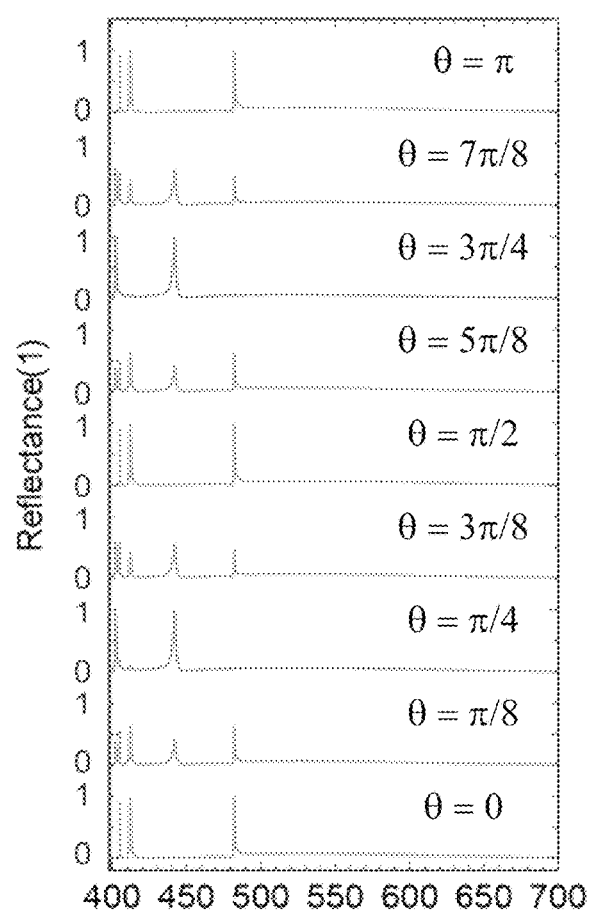
Figure 4F:
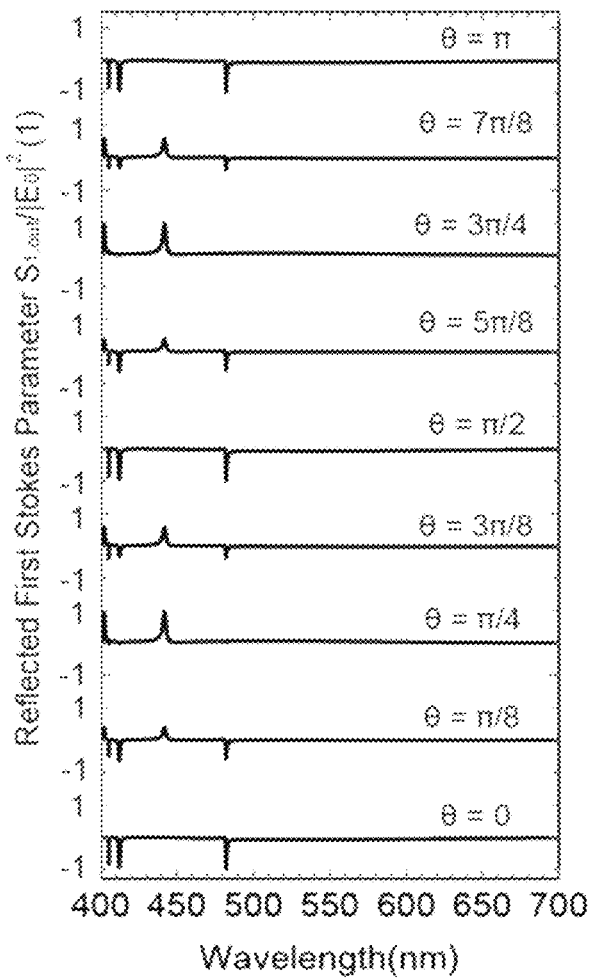

FIG. 4D-F show colorimetric sensing capabilities of our metasurface for an anisotropic sample, matching the linearly birefringent properties of fibrous biological tissue, for ε=2 and varying orientation angle θ of the tissue optical axis. The CIE chromaticity diagram is shown in FIG. 4D, where the inset magnifies the CIE chromaticities obtained for θ-values off the optical axis. FIG. 4E shows the reflectance spectra for varying θ, where the inset and line colors correspond to reflected structural color. FIG. 4F demonstrates the reflected first Stokes parameter $S_{1,out}/|E_0|^2$, demonstrating the degree of x- and y-polarized light reflected by the metasurface-tissue system (corresponding to $S_{1,out}/|E_0|^2=+1$ or $S_{1,out}/|E_0|^2=-1$, respectively).

For anisotropic tissue of thickness d=75 μm, exhibiting the largest $\Delta E_{ab}$ with varying θ in FIG. 3C, FIG. 4D-F details the metasurface colorimetric response for $$\theta = 0 : \frac{\pi}{8} : \pi.$$

FIG. 4D shows the resulting CIE chromaticity diagram, where the inset indicates how $$\frac{\pi}{2}$$

shifts in tissue orientation off the optical axes, i.e. $\frac{\pi}{4}$ vs. $\frac{3\pi}{4}$, $\frac{3\pi}{8}$ vs. $\frac{7\pi}{8}$, $\frac{\pi}{8}$ vs. $\frac{5\pi}{8}$, exhibit a distinct colorimetric response due to asymmetries engineered in the metasurface geometry. At $$\theta = 0, \frac{\pi}{2}, \pi,$$

the incident polarization state of light is aligned with the tissue optical axis, resulting in an identical colorimetric response. The corresponding reflectance spectra are shown in FIG. 4E where the line colors and inset represent reflected structural color. In contrast to the colorimetric response due to changes in refractive index, where variation in the GMRs is negligible (FIG. 4B-C), the blue-to-green color transition in FIG. 4D-E arises predominantly from tuning of the narrow-bandwidth GMRs. To elucidate this effect, we quantify the polarization state of the fields interacting with our metasurface by their Stokes parameters[77]

$$S_0 = |E_x|^2 + |E_y|^2 \quad (4)$$

$$S_1 = |E_x|^2 - |E_y|^2 \quad (5)$$

$$S_2 = E_x E^*_y + E_y E^*_x \quad (6)$$

$$S_3 = i(E_x E^*_y - E_y E^*_x) \quad (7)$$

where $S_0$ describes the total light intensity, $S_1$ the differential intensity between x- and y-polarized light, $S_2$ the differential intensity of $$\pm \frac{\pi}{4}$$

polarized light and $S_3$ describes the differential intensity of right- and left-handed light.

FIG. 4F shows $S_{1,out}/|E_0|^2$, the first Stokes parameter for outgoing fields reflected by the metasurface-tissue system, at $$\theta = 0 : \frac{\pi}{8} : \pi,$$

corresponding to the optical axis orientations studied in FIG. 4D-E. For tissue orientations along the optical axes, $$\theta = 0, \frac{\pi}{2}, \pi,$$

the field incident on the metasurface corresponds to $E_{in,meta} = E_{in} = [0, E_0]$ and $S_{1,out}/|E_0|^2$ approaches a value of −1 at the GMRs, indicating that the majority of the reflected light at the GMR frequencies is y-polarized. In contrast, for $$\theta = \frac{\pi}{4}, \frac{3\pi}{4},$$

$S_{1,out}/|E_0|^2$ approaches a value of 1 at the GMRs. This indicating that the majority of the reflected light at the GMR frequencies is x-polarized, resulting in the largest green-to-blue colorimetric difference of the θ-values considered (see also FIG. 2K for the polarization-sensitive colorimetric response in an isotropic medium). The changes in $S_{1,out}/|E_0|^2$ with varying θ are attributed to changes in the polarization state of $E_{in,meta}$, incident on our metasurface. Thus, FIG. 4D-F shows how the polarization-sensitive colorimetric response of our metasurface can be utilized to quantitatively map the orientation angle of linearly birefringent media, such as fibrous biological tissue, onto reflected structural color.

Importantly, the combination of FIG. 4A-C and FIG. 4D-F demonstrate how our metasurface has the capability to simultaneously probe and spectrally separate (i) refractive-index effects and (ii) polarization-sensitive effects, presenting a significant advantage in comparison to systems previously developed, where (i) and (ii) were inherently convoluted due to broad spectral linewidths or near-field effects.[35,42]

Figures 5A, 5D:
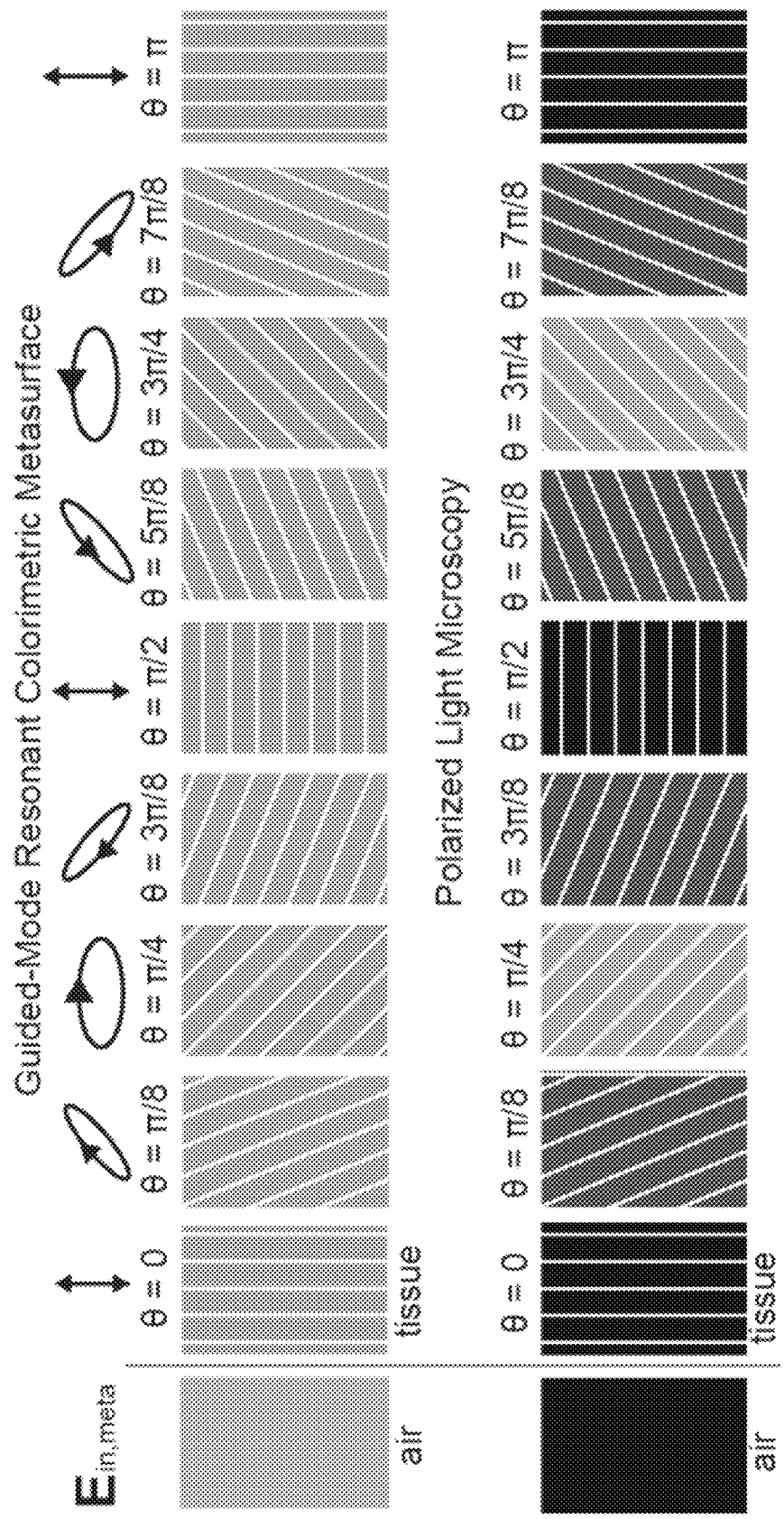
FIG. 5A shows the polarization state of the fields incident on the metasurface and corresponding colorimetric response in air and in tissue at various optical axis orientation angles, according to an embodiment of the invention.
FIG. 5D shows computed colorimetric response from a tissue obtained using polarized light microscopy with varying orientation angles, according to an embodiment of the invention.

The application of our metasurface to fibrous tissue diagnostics is laid out in FIG. 5A-I, where its performance is quantitatively compared to polarized light microscopy. For $E_{in} = [0, E_0]$, the top row of FIG. 5A shows the polarization state of the fields incident on the metasurface, $E_{in,meta}$, for optical axis orientation angles $$\theta = 0 : \frac{\pi}{8} : \pi$$

at the example wavelength λ=600 nm. While in real tissue sections, transitions in fiber orientation can be continuous and variable, regular θ steps of $$\frac{\pi}{8}$$

are chosen for clarity in this proof of concept.

Note that for $$\theta = \frac{\pi}{8}, \frac{\pi}{4}, \frac{3\pi}{8},$$

$E_{in,meta}$ is left-handed, while for $$\theta = \frac{5\pi}{8}, \frac{3\pi}{4}, \frac{7\pi}{8},$$

$E_{in,meta}$ is right-handed with otherwise identical opening angle and orientation of the polarization ellipse at $$\frac{\pi}{2}$$

periodicity. The second row of FIG. 5A shows the corresponding reflected structural color from the metasurface (colorimetric response) in an air ($\varepsilon=1$) and fibrous tissue ($\varepsilon=2$) environment with varying orientation angles, where white lines indicate the optical axis orientation. The optical axis of the fibrous tissue model is varied at $$\theta = 0 : \frac{\pi}{8} : \pi.$$

Inspired by the alignment of collagen fibers visualized with SHG microscopy at the tumor margins of breast cancer tissue sections,[9]

FIG. 5B-C schematically illustrates the computed structural colors scattered by our metasurface (i.e., its colorimetric response) when interfaced with tumor tissue sections of an early-stage, localized cancer (FIG. 5B) and an advanced-stage, metastasized cancer (FIG. 5C). For the localized cancer, the tangentially-aligned collagen fibers, with respect to tumor margins, are visualized by changes in the metasurface structural color. For an advanced-stage cancer, collagen fibers have been shown to locally exhibit outward-reorientation with respect to tumor margins, thus providing cancer cells a pathway to metastasis,[9,78] indicated by the constant colorimetric response in this simplified illustration. Note that the dashed lines are overlaid to indicate the presence and orientation of the simulated fiber optical axes and would not be visible in a microscope image.

We now compare the diagnostic performance of our metasurface with polarized light microscopy, where the linearly birefringent medium is imaged between crossed polarizers. FIG. 5B shows the corresponding colorimetric response computed to simulate polarized light microscopy for an identical tissue sample with d=75 μm and Δn=0.003. From the Michel-Lévy Birefringence Chart,[79] we find that for the studied sample thickness and birefringence, polarized light microscopy yields a grey colorimetric response. Describing the crossed linear polarizers with Jones calculus, FIG. 5B utilizes the 1976 CIE Lab color space with varying orientation angle θ of the tissue optical axis.

By comparing polarized light microscopy to the colorimetric metasurface response in FIG. 5A, two disadvantages become apparent: (i) Polarized light microscopy does not yield colorimetric imaging of changes in refractive index (i.e. air to tissue). (ii) The configurational symmetries of the fibrous tissue sample with respect to the input and output linear polarizers ($C_4$-rotational symmetry and reflective symmetry) lead to periodic repetitions of the colorimetric response in polarized light microscopy (FIG. 5B). Note that the metasurface circumvents (ii) by symmetry-breaking (see FIG. 4E-F and FIG. 5A).

FIG. 5E-F demonstrates the corresponding colorimetric response, simulating polarized light microscopy for the sample shown in FIG. 5B-C. FIG. 5E shows how the periodicity in the colorimetric response obtained in polarized light microscopy (FIG. 5D) can lead to ambiguity in the determination of the orientation of fibrous biological tissue. Further, for the outward-oriented fibers in FIG. 5F, no color contrast is seen between the fibrous tissue and the surrounding medium, due to lack of refractive-index sensing capabilities. Thus, rotation of the sample in FIG. 5F is required to discern the presence of fibrous tissue.

FIG. 5D shows computed colorimetric response obtained for an identical sample as in FIG. 5A for polarized light microscopy. FIG. 5E-F is a schematic illustration of the polarized light microscopy colorimetric response for a localized tumor (FIG. 5E) and a metastasized tumor (FIG. 5F). Dashed lines are overlaid to mark the orientation of the fiber optical axis.

FIGS. 5G, 5J-N illustrates the Stokes parameter analysis of the reflected fields from the metasurface-tissue system. FIGS. 5G, 5J, 5K: second Stokes parameter, $S_{2,out}/|E_0|^2$, for θ-values where the orientation angle of $E_{in,meta}$ is reflected on the y-axis. FIGS. 5L, 5M, 5N: third Stokes parameter, $S_{3,out}/|E_0|^2$, for θ-values where $E_{in,meta}$ is of varying handedness and identical ellipticity.

FIG. 5H is a graph of colorimetric discrimination, $\Delta E_{ab}$, of θ-values off the optical axis $$\left(\theta = \frac{\pi}{8}, \frac{\pi}{4}, \frac{3\pi}{8}, \frac{5\pi}{8}, \frac{3\pi}{4}, \frac{7\pi}{8}\right)$$

in comparison to those on the optical axis $$\left(\theta = 0, \frac{\pi}{2}, \pi\right)$$

for the metasurface and polarized light microscopy. Histogram bars are colored according to the reflected structural color at a given θ-value from FIG. 5A,5D. The black line indicates the just-noticeable difference (JND≈0.023). (i) Metasurface $\Delta E_{ab}$ of θ-values which are indistinguishable in polarized light microscopy. The left three columns compute $\Delta E_{ab}$ for $E_{in,meta}$ with orientation reflected on the y-axis (FIGS. 5G, 5J, 5K), while the right three columns compute $\Delta E_{ab}$ for $E_{in,meta}$ of varying handedness (FIGS. 5L, 5M, 5N). Half of each histogram bar is filled with the colorimetric response of the respective θ-value denoted on the horizontal axis.

The ability of our metasurface to colorimetrically distinguish tissue orientation angles, θ, which are indistinguishable in polarized light microscopy, arises from engineered symmetry breaking of the metasurface unit-cell geometry, which leads to a selective interaction with incident polarization states, $E_{in,meta}$, of interest. FIGS. 5G, 5J-N analyze the second and third Stokes parameters (eqs. 6 and 7) of the reflected fields ($S_{2,out}$ and $S_{3,out}$) upon interaction with the metasurface. FIGS. 5G, 5J, 5K compare $S_{2,out}/|E_0|^2$ for orientation angles of θ which lead to polarization states of $E_{in,meta}$ with equal ellipticity and tilt-angles mirrored along the y-axis $$\left(\text{e.g. } \theta = \frac{\pi}{8} \text{ and } \theta = \frac{3\pi}{8}\right).$$

Because the rhombohedral perturbation in our metasurface lacks reflective symmetry along the x- and y-axes, the graphs show the resulting differential $S_{2,out}/|E_0|^2$, signifying a spectrally-distinct response in amplitude and sign both in the GMRs at shorter wavelengths and the broad spectral background at longer wavelengths.

FIGS. 5L, 5M, 5N compare $S_{3,out}/|E_0|^2$ for orientations of θ which lead to $E_{in,meta}$ with opposite handedness but equal ellipticity and orientation angle of the polarization ellipse $$\left(\text{e.g. } \theta = \frac{\pi}{8} \text{ and } \theta = \frac{5\pi}{8}\right).$$

The selective spectral response to left- and right-handed elliptically polarized light is attributed to the two-dimensionally chiral geometry[80] of the rhombohedral metasurface perturbation. Note that greater spectral differences are seen at longer wavelengths, which exhibit a greater ellipticity in $E_{in,meta}$.

We now quantify the diagnostic performance of our GMR metasurface in comparison to polarized light microscopy by $\Delta E_{ab}$, the 1976 CIE Lab color discrimination (eq. 3). FIG. 5H shows $\Delta E_{ab}$, the colorimetric discrimination of θ-values off the optical axis $$\left(\theta = \frac{\pi}{8}, \frac{\pi}{4}, \frac{3\pi}{8}, \frac{5\pi}{8}, \frac{3\pi}{4}, \frac{7\pi}{8}\right)$$

in comparison to those on the optical axis $$\left(\theta = 0, \frac{\pi}{2}, \pi\right)$$

for the metasurface and polarized light microscopy, respectively. The color of histogram bars in FIG. 5H corresponds to the colorimetric response at a given θ-value, while the black line indicates the just noticeable difference (JND≈0.023). Every θ-value of the metasurface shown in FIG. 5H yields a distinct $\Delta E_{ab}$, while in contrast, $\Delta E_{ab}$ values repeat periodically for polarized light microscopy. Thus, FIG. 5H quantifies how the color discrimination of our metasurface outperforms polarized light microscopy at the studied θ-values.

FIG. 5I quantifies how the metasurface can distinguish orientation angles θ of the tissue optical axis which are indistinguishable in polarized light microscopy (i.e. $\Delta E_{ab}$=0). The left three columns of FIG. 5I show $\Delta E_{ab}$ for polarization states of $E_{in,meta}$ with equal ellipticity, while tilt-angles are mirrored along the y-axis (corresponding to FIGS. 5G, 5J, 5K). The right three columns of FIG. 5I show $\Delta E_{ab}$ for polarization states of $E_{in,meta}$ with equal ellipticity and tilt-angles but opposite handedness (corresponding to FIGS. 5L, 5M, 5N). Within a single column, the corresponding colorimetric responses are shown for side-by-side comparison in the left and right halves of the histogram column labeled accordingly, while the black line indicates the just noticeable difference (JND≈0.023). Note that the smallest $\Delta E_{ab}$ values shown in FIG. 5I are close to the JND, nearing the limit of what is distinguishable by the human eye. For improved precision in the extraction of colorimetric information, in the tissue-diagnostic application envisioned with our metasurface, we propose the CIE chromaticity coordinates of the obtained images to be analyzed in a computer code. Thus, every quantitative difference in colorimetric response can be mapped onto the corresponding orientation angle θ and securely read out by clinicians.

Dispersion Engineering

Figure 6C:
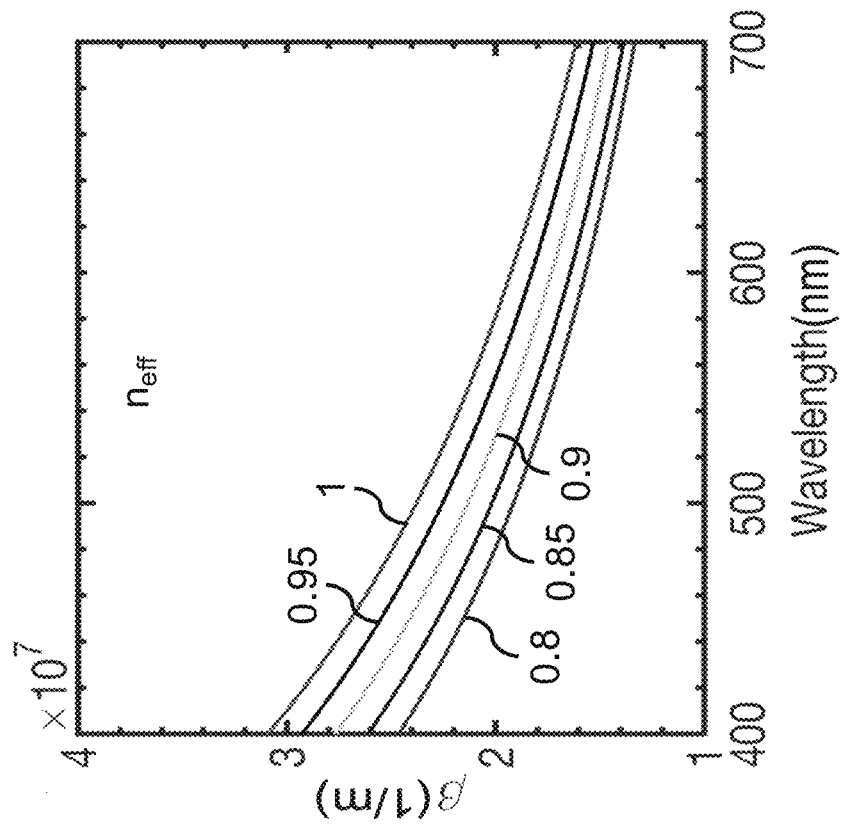
FIG. 6C shows first-order TE dispersion relation for varying effective refractive index values for the nanoscale layers, according to an embodiment of the invention.
Figure 6B:
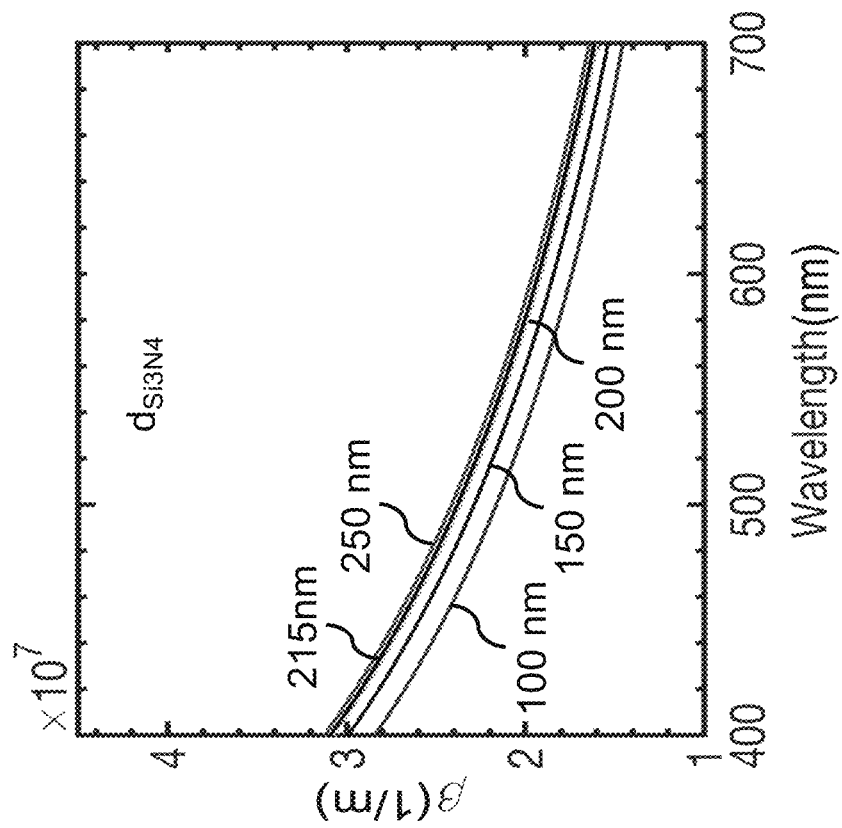
FIG. 6B shows first-order TE dispersion relation of a stacked dielectric layer for varying layer thicknesses, according to an embodiment of the invention.

FIG. 6A shows reflectance spectra of stacked dielectric layer waveguide structure for varying $d_{Si3N4}$ and $d_{SiO2}$=75 nm on a SiO$_2$ substrate interfaced with ε=2, corresponding to isotropic biological tissue. FIG. 6B shows first-order TE dispersion relation of the stacked dielectric layer for varying $d_{Si3N4}$ shown in FIG. 6A, where β (1/m) is the propagation constant. FIG. 6C shows first-order TE dispersion relation for $d_{Si3N4}$=215 nm and $d_{SiO2}$=75 nm (other media as in FIG. 6A-B), where the effective refractive index $n_{eff}n_{Si3N4}$ is varied for the nanoscale layers resulting in a blueshift for decreasing $n_{eff}$.

Spectral information on the stacked dielectric layer system was obtained from a 2D numerical model in COMSOL Multiphysics 5.3a, with a maximum mesh size of 24 nm and a minimum mesh size of 0.7 nm. Domain heights were set at 1500 nm on the top ($\varepsilon_{air}$=1) and bottom ($\varepsilon_{tissue}$=2) of the Si$_3$N$_4$ and SiO$_2$ layers, respectively. Reflectance spectra of the stacked dielectric layer, as shown in FIG. 6A, were obtained at 1 nm steps, while the dispersion relations of the first-order transverse-electric (TE) mode shown in FIG. 6B-C were obtained from boundary mode analysis, where electric field components solved for the out-of-plane vector (accordingly, dispersion relations of transverse-magnetic (TM) modes are obtained from the in-plane vector).

To achieve broadband anti-reflective properties at visible frequencies, we employ the principles of a W-type, two-layer dielectric coating defined as $$n_{Si_3N_4} d_{Si_3N_4} = \frac{\lambda_{min}}{2} \text{ and } n_{SiO_2} d_{SiO_2} = \frac{\lambda_{min}}{4},$$

for refractive index n and thickness d, where $\lambda_{min}$ denotes the wavelength of minimum reflectance in the W-shaped spectral signature.[5] Based on these guidelines for $\lambda_{min}$=450 nm, the simulated reflectance spectra for $d_{Si_3N_4}$=100 nm and $d_{SiO_2}$=75 nm are shown in FIG. 6A. For constant $d_{SiO_2}$, we then varied $d_{Si_3N_4}$ between 100-250 nm. While the reflectance remains <0.1 for all considered thicknesses, $d_{Si_3N_4}$=100, 215 nm minimize reflectance in the relevant spectral range. Thus, the remainder of this work studies a system with $d_{Si_3N_4}$=215 nm, as it supports higher-order waveguide modes at visible frequencies, enabling greater colorimetric tunability in the targeted application.

FIG. 6B shows the first-order TE dispersion relation of a stacked dielectric layer on a SiO$_2$ substrate with varying $d_{Si3N4}$ and $d_{SiO2}$=75 nm, embedded in an environment of ε=2 corresponding to isotropic biological tissue, where β represents the propagation constant. With increasing $d_{Si3N4}$, a redshift in the dispersion relation is observed, indicating a resulting redshift in the leaky waveguide modes of our metasurface. Our final metasurface design exhibits $d_{Si3N4}$=215 nm, which satisfies the following trade-offs: (i) flat spectral background at relevant frequency ranges, (ii) small enough number of guided-mode resonances to sustain polarization-tunability of the reflectance spectrum upon x- and y-polarization, (iii) large enough spacing between the guided-mode resonances to allow for a sufficient colorimetric distinction of varying incident polarization.

FIG. 6C shows the dispersion relation of a stacked dielectric layer on a SiO$_2$ substrate with $d_{Si3N4}$=215 nm and $d_{SiO2}$=75 nm. Here, the refractive index of the nanoscale Si$_3$N$_4$ and SiO$_2$ layers is set as an effective refractive index $n_{eff}n_{Si3N4}$ and $n_{eff}n_{SiO2}$, respectively. As $n_{eff}$ decreases from 1 to 0.8, a blueshift in the refractive index is observed. Our metasurface, which is composed of perturbations in the stacked dielectric layer, will have an effective refractive index which decreases in value as the number of perturbations increase (thus lowering the refractive index of the system). This explains the spectral blueshifts observed between FIG. 2F-H.

Colorimetry

FIG. 7 shows color matching functions $\bar{x}(\lambda)$ (red), $\bar{y}(\lambda)$ (green), $\bar{z}(\lambda)$ (blue), according to CIE colorimetric standards.

The observed color, or chromaticity, reflected by our metasurface-tissue system was computed in Mathematica following CIE colorimetric standards.[6-9] CIE colorimetry is a method by which spectral information is converted to the physiological color perception, or color stimulus, of the human eye.[8]

In the 1931 CIE xyz color space,[6,7] chromaticity is obtained by convolution of spectral intensity with the sensitivity of the human eye by so-called color matching functions, $\bar{x}(\lambda)$, $\bar{y}(\lambda)$, $\bar{z}(\lambda)$, as shown in FIG. 7, where $\lambda$ denotes the wavelength. Spectral data with intensity $I(\lambda)$ is convoluted with the color-matching functions, resulting in the tristimulus values:

$$X = \int I(\lambda) \bar{x}(\lambda) d\lambda \tag{8}$$

$$Y = \int I(\lambda) \bar{y}(\lambda) d\lambda \tag{9}$$

$$Z = \int I(\lambda) \bar{z}(\lambda) d \tag{10}$$

where numerical integration was performed in Mathematica. From this, at each studied $\lambda$-value, the chromaticity coordinates, x, y, and z are obtained by normalizing the X, Y and Z coordinates as:

$$x = \frac{X}{X+Y+Z} \tag{11}$$

$$y = \frac{Y}{X+Y+Z} \tag{12}$$

$$z = \frac{Z}{X+Y+Z} \tag{13}$$

where the resulting chromaticity is obtained from the x, y, z coordinates on the CIE chromaticity diagram as shown in FIG. 2I-K and FIG. 4A,4D.

While successfully converting spectral information into observed chromaticity, the 1931 CIE xyz color space has limited abilities to quantify the ability of the human eye to distinguish adjacent colors. In particular, equal distances on the CIE chromaticity diagram are not perceived as equal differences in chromaticity by the human eye.[8]

The 1976 CIE Lab color space addresses this challenge as a uniform color space (UCS), where equal distances between coordinates are perceived equally by the human eye, as quantified by the 1976 CIE Lab color discrimination, $\Delta E_{ab}$ (eq. 3).[8] The 1976 CIE Lab color space can be used with the 1931 CIE xyz color space for observation angles between 1° and 4° of equivalent size and shape observed in an identical environment (white to middle-gray).[8]

The 1976 CIE Lab coordinates were obtained from the CIE xyz coordinates in Mathematica from the following equations:[8]

$$L = 1.16\, f\!\left(\frac{Y}{Y_n}\right) - 0.16 \tag{14}$$

$$a = 5\left[f\!\left(\frac{X}{X_n}\right) - f\!\left(\frac{Y}{Y_n}\right)\right] \tag{15}$$

$$b = 2\left[f\!\left(\frac{Y}{Y_n}\right) - f\!\left(\frac{Z}{Z_n}\right)\right] \tag{16}$$

where $X_n$, $Y_n$ and $Z_n$ are the 1931 CIE XYZ white point parameters. The function f(t) is defined as a piecewise function[8]

$$f(t) = (t)^{\frac{1}{3}} \text{ if } t > \left(\frac{6}{29}\right)^3 \tag{17}$$

$$f(t) = \frac{1}{3}\left(\frac{29}{6}\right)^2 t + \frac{4}{29} \text{ if } t \leq \left(\frac{6}{29}\right)^3. \tag{18}$$

CONCLUSION

In conclusion, we have introduced a guided-mode resonant dielectric metasurface with the ability to quantitatively map the orientation and material composition of linearly birefringent media, in ranges applicable to fibrous biological tissue, onto reflected structural color. By breaking planar symmetry, we designed a rhombohedral metasurface unit-cell element as a perturbation in dispersion-engineered stacked dielectric layers, which reflects polarization-sensitive structural color due to narrow-bandwidth guided-mode resonances on a flat spectral background. When the refractive index of the medium at the metasurface interface transitions from air to biological tissue, we observe a red-to-green colorimetric response, attributed to spectral shifts in the anti-reflective background and completely decoupled from changes in the guided-mode resonances. Further, when interfaced with a linearly birefringent tissue medium, our metasurface is demonstrated to quantitatively map tissue orientation angle $\theta$ onto distinct, reflected structural color yielding a blue-to-green transition. Thus, our metasurface is shown to present an advantage to polarized light microscopy, where different $\theta$ off of the optical axis can yield an identical colorimetric response. We demonstrate the promise of our metasurface platform in clinical applications by numerically simulating the example case of cancer tissue diagnostics, where the reflected structural color enables the distinction between localized and metastasized tumor tissue sections, and quantitatively demonstrate how our metasurface outperforms polarized light microscopy. This proof-of-concept system enables future studies where colorimetric metasurfaces can be further optimized for their polarization response. By harnessing and combining the strengths of guided-mode-resonant dielectric metasurfaces to yield a quantitative, polarization-selective colorimetric response, we demonstrate their potential to enhance the selective visualization capabilities in anisotropic media. This opens avenues for clinical application to a broad palette of serious diseases related to transitions between order and disorder fibrous biological tissue.

REFERENCES (1) Mohan, H. *Textbook of Pathology*, 6th ed.; Jaypee Brothers Medical Publishers: New Dehli, NCT Dehli, 2010.
(2) Hsiao, K.; Chapman, P.; Nilsen, S.; Eckman, C.; Harigaya, Y.; Younkin, S.; Yang, F.; Cole, G. Correlative Memory Deficits, Abeta Elevation, and Amyloid Plaques in Transgenic Mice. *Science* 1996, 274, 99-102.
(3) Jin, L. W.; Claborn, K. A.; Kurimoto, M.; Geday, M. A.; Maezawa, I.; Sohraby, F.; Estrada, M.; Kaminksy, W.; Kahr, B. Imaging Linear Birefringence and Dichroism in Cerebral Amyloid Pathologies. *Proc. Natl. Acad. Sci. U.S.A.* 2003, 100, 15294-15298.

(4) Whittaker, P.; Kloner, R. A.; Boughner, D. R.; Pickering, J. G. Quantitative Assessment of Myocardial Collagen with Picrosirius Red Staining and Circularly Polarized Light. *Basic Res. Cardiol.* 1994, 89, 397-410.

(5) Ghosh, N.; Wood, M.; Vitkin, A. Polarized Light Assessment of Complex Turbid Media Such as Biological Tissues Using Mueller Matrix Decomposition. In *Handbook of Photonics for Biomedical Science;* 2010; pp 253-282.

(6) Friedman, S. L. Mechanisms of Hepatic Fibrogenesis. *Gastroenterology* 2008, 134, 1655-1669.

(7) Jacques, S. L.; Ramella-Roman, J. C.; Lee, K. Imaging Skin Pathology with Polarized Light. *J. Biomed. Opt.* 2002, 7, 329-340.

(8) Swami, M. K.; Manhas, S.; Buddhiwant, P.; Ghosh, N.; Uppal, A.; Gupta, P. K. Polar Decomposition of 3×3 Mueller Matrix: A Tool for Quantitative Tissue Polarimetry. *Opt. Express* 2006, 14, 9324-9337.

(9) Provenzano, P. P.; Eliceiri, K. W.; Campbell, J. M.; Inman, D. R.; White, J. G.; Keely, P. J. Collagen Reorganization at the Tumor-Stromal Interface Facilitates Local Invasion. *BMC Med.* 2006, 4, 38.

(10) Pickup, M. W.; Mouw, J. K.; Weaver, V. M. The Extracellular Matrix Modulates the Hallmarks of Cancer. *EMBO Rep.* 2014, 15, 1243-1253.

(11) Tao, Y. K.; Shen, D.; Sheikine, Y.; Ahsen, O. O.; Wang, H. H.; Schmolze, D. B.; Johnson, N. B.; Brooker, J. S.; Cable, A. E.; Connolly, J. L.; Fujimoto, J. G. Assessment of Breast Pathologies Using Nonlinear Microscopy. *Proc. Natl. Acad. Sci.* 2014, 111, 15304-15309.

(12) Ghosh, N.; Wood, M.; Vitkin, A. Polarized Light Assessment of Complex Turbid Media Such as Biological Tissues Using Mueller Matrix Decomposition. In *Handbook of Photonics for Biomedical Science*; Tuchin, V. V., Ed.; CRC Press/Taylor & Francis: Boca Raton, 2010; pp 253-282.

(13) Ghosh, N.; Vitkin, A. I. Tissue Polarimetry: Concepts, Challenges, Applications, and Outlook. *J. Biomed. Opt.* 2011, 16, 110801.

(14) Huang, D.; Swanson, E. A.; Lin, C. P.; Schuman, J. S.; Stinson, W. G.; Chang, W.; Hee, M. R.; Flotte, T.; Gregory, K.; Puliafito, C. A.; Fujimoto, J. G. Optical Coherence Tomography. *Science* 1991, 254, 1178-1181.

(15) Hee, M. R.; Swanson, E. A.; Fujimoto, J. G.; Huang, D. Polarization-Sensitive Low-Coherence Reflectometer for Birefringence Characterization and Ranging. *J. Opt. Soc. Am. B* 1992, 9, 903-908.

(16) Freund, I.; Deutsch, M.; Sprecher, A. Connective Tissue Polarity. Optical Second-Harmonic Microscopy, Crossed-Beam Summation, and Small-Angle Scattering in Rat-Tail Tendon. *Biophys. J.* 1986, 50, 693-712.

(17) Campagnola, P. J.; Wei, M.; Lewis, A.; Loew, L. M. High-Resolution Nonlinear Optical Imaging of Live Cells by Second Harmonic Generation. *Biophys. J.* 1999, 77, 3341-3349.

(18) Campagnola, P. J.; Loew, L. M. Second-Harmonic Imaging Microscopy for Visualizing Biomolecular Arrays in Cells, Tissues and Organisms. *Nat. Biotechnol.* 2003, 21, 1356-1360.

(19) Chen, X.; Nadiarynkh, O.; Plotnikov, S.; Campagnola, P. J. Second Harmonic Generation Microscopy for Quantitative Analysis of Collagen Fibrillar Structure. *Nat. Protoc.* 2012, 7, 654-669.

(20) Zipfel, W. R.; Williams, R. M.; Christie, R.; Nikitin, A. Y.; Hyman, B. T.; Webb, W. W. Live Tissue Intrinsic Emission Microscopy Using Multiphoton-Excited Native Fluorescence and Second Harmonic Generation. *Proc. Natl. Acad. Sci. U.S.A.* 2003, 100, 7075-7080.

(21) Cui, J. Z.; Tehrani, A. Y.; Jett, K. A.; Bernatchez, P.; van Breemen, C.; Esfandiarei, M. Quantification of Aortic and Cutaneous Elastin and Collagen Morphology in Marfan Syndrome by Multiphoton Microscopy. *J. Struct. Biol.* 2014, 187, 242-253.

(22) Provenzano, P. P.; Inman, D. R.; Eliceiri, K. W.; Knittel, J. G.; Yan, L.; Rueden, C. T.; White, J. G.; Keely, P. J. Collagen Density Promotes Mammary Tumor Initiation and Progression. *BMC Med.* 2008, 6, 11.

(23) Tu, H.; Liu, Y.; Turchinovich, D.; Marjanovic, M.; Lyngsø, J. K.; Legsgaard, J.; Chaney, E. J.; Zhao, Y.; You, S.; Wilson, W. L.; Xu, B.; Dantus, M.; Boppart, S. A. Stain-Free Histopathology by Programmable Supercontinuum Pulses. *Nat. Photonics* 2016, 10, 534-540.

(24) Oldenbourg, R.; Mei, G. New Polarized Light Microscope with Precision Universal Compensator. *J. Microsc.* 1995, 180, 140-147.

(25) Everett, M. J.; Schoenenberger, K.; Colston, B. W.; Da Silva, L. B. Birefringence Characterization of Biological Tissue by Use of Optical Coherence Tomography. *Opt. Lett.* 1998, 23, 228-230.

(26) de Boer, J. F.; Milner, T. E.; van Gemert, M. J. C.; Nelson, J. S. Two-Dimensional Birefringence Imaging in Biological Tissue by Polarization-Sensitive Optical Coherence Tomography. *Opt. Lett.* 1997, 22, 934-936.

(27) Brasselet, S.; Alt-Belkacem, D.; Gasecka, A.; Munhoz, F.; Brustlein, S.; Brasselet, S. Influence of Birefringence on Polarization Resolved Nonlinear Microscopy and Collagen SHG Structural Imaging. *Opt. Express* 2010, 18, 14859.

(28) Junqueira, L. C. U.; Bignolas, G.; Brentani, R. R. Picrosirius Staining plus Polarization Microscopy, a Specific Method for Collagen Detection in Tissue Sections. *Histochem. J.* 1979, 11, 447-455.

(29) Fernandez-Flores, A. A Review of Amyloid Staining: Methods and Artifacts. *Biotech. Histochem.* 2011, 86, 293-301.

(30) Genevet, P.; Capasso, F.; Aieta, F.; Khorasaninejad, M.; Devlin, R. Recent Advances in Planar Optics: From Plasmonic to Dielectric Metasurfaces. *Optica* 2017, 4, 139-152.

(31) Forster, J. D.; Noh, H.; Liew, S. F.; Saranathan, V.; Schreck, C. F.; Yang, L.; Park, J. C.; Prum, R. O.; Mochrie, S. G. J.; O'Hern, C. S.; Cao, H.; Dufresne, E. R. Biomimetic Isotropic Nanostructures for Structural Coloration. *Adv. Mater.* 2010, 22, 2939.

(32) Keshavarz Hedayati, M.; Elbahri, M. Review of Metasurface Plasmonic Structural Color. *Plasmonics* 2017, 12, 1463-1479.

(33) Kristensen, A.; Yang, J. K. W.; Bozhevolnyi, S. I.; Link, S.; Nordlander, P.; Halas, N. J.; Mortensen, N. A. Plasmonic Colour Generation. *Nat. Rev. Mater.* 2016, 2, 16088.

(34) Yang, B.; Cheng, H.; Chen, S.; Tian, J. Structural Colors in Metasurfaces: Principle, Design and Applications. *Mater. Chem. Front.* 2019, 3, 750-761.

(35) Ellenbogen, T.; Seo, K.; Crozier, K. B. Chromatic Plasmonic Polarizers for Active Visible Color Filtering and Polarimetry. *Nano Lett.* 2012, 12, 1026-1031.

(36) Duempelmann, L.; Casari, D.; Luu-Dinh, A.; Gallinet, B.; Novotny, L. Color Rendering Plasmonic Aluminum Substrates with Angular Symmetry Breaking. *ACS Nano* 2015, 9, 12383-12391.

(37) Duempelmann, L.; Luu-Dinh, A.; Gallinet, B.; Novotny, L. Four-Fold Color Filter Based on Plasmonic Phase Retarder. *ACS Photonics* 2016.

(38) Duempelmann, L.; Gallinet, B.; Novotny, L. Multispectral Imaging with Tunable Plasmonic Filters. *ACS Photonics* 2017, 4, 236-241.
(39) Li, Z.; Clark, A. W.; Cooper, J. M. Dual Color Plasmonic Pixels Create a Polarization Controlled Nano Color Palette. *ACS Nano* 2016, 10, 492-498.
(40) Balaur, E.; Sadatnajafi, C.; Kou, S. S.; Lin, J.; Abbey, B. Continuously Tunable, Polarization Controlled, Colour Palette Produced from Nanoscale Plasmonic Pixels. *Sci. Rep.* 2016, 6, 28062.
(41) Vashistha, V.; Vaidya, G.; Hegde, R. S.; Serebryannikov, A. E.; Bonod, N.; Krawczyk, M. All-Dielectric Metasurfaces Based on Cross-Shaped Resonators for Color Pixels with Extended Gamut. *ACS Photonics* 2017, 4, 1076-1082.
(42) Vashistha, V.; Vaidya, G.; Gruszecki, P.; Serebryannikov, A. E.; Krawczyk, M. Polarization Tunable All-Dielectric Color Filters Based on Cross-Shaped Si Nanoantennas. *Sci. Rep.* 2017, 7, 8092.
(43) Olson, J.; Manjavacas, A.; Liu, L.; Chang, W. S.; Foerster, B.; King, N. S.; Knight, M. W.; Nordlander, P.; Halas, N. J.; Link, S. Vivid, Full-Color Aluminum Plasmonic Pixels. *Proc. Natl. Acad. Sci. U.S.A.* 2014, 111, 14348-14353.
(44) Olson, J.; Manjavacas, A.; Basu, T.; Huang, D.; Schlather, A. E.; Zheng, B.; Halas, N. J.; Nordlander, P.; Link, S. High Chromaticity Aluminum Plasmonic Pixels for Active Liquid Crystal Displays. *ACS Nano* 2016, 10, 1108-1117.
(45) Uddin, M. J.; Khaleque, T.; Magnusson, R. Guided-Mode Resonant Polarization-Controlled Tunable Color Filters. *Opt. Express* 2014, 22, 12307.
(46) Uddin, M. J.; Magnusson, R. Highly Efficient Color Filter Array Using Resonant $Si_3N_4$ Gratings. *Opt. Express* 2013, 21, 12495.
(47) Kim, Y.; Jung, K.; Cho, J.; Hyun, J. K. Realizing Vibrant and High-Contrast Reflective Structural Colors from Lossy Metals Supporting Dielectric Gratings. *ACS Nano* 2019, 13, 10717-10726.
(48) Rubin, N. A.; Zaidi, A.; Juhl, M.; Li, R. P.; Mueller, J. P. B.; Devlin, R. C.; Leósson, K.; Capasso, F. Polarization State Generation and Measurement with a Single Metasurface. *Opt. Express* 2018, 26, 21455.
(49) Rubin, N. A.; D'Aversa, G.; Chevalier, P.; Shi, Z.; Chen, W. T.; Capasso, F. Matrix Fourier Optics Enables a Compact Full-Stokes Polarization Camera. *Science* 2019, 364.
(50) Li, Z.; Clark, A. W.; Cooper, J. M. Dual Color Plasmonic Pixels Create a Polarization Controlled Nano Color Palette. *ACS Nano* 2016, 10, 492-498.
(51) Duempelmann, L.; Luu-Dinh, A.; Gallinet, B.; Novotny, L. Four-Fold Color Filter Based on Plasmonic Phase Retarder. *ACS Photonics* 2016, 3, 190-196.
(52) Lee, Y.; Kim, S. J.; Park, H.; Lee, B. Metamaterials and Metasurfaces for Sensor Applications. *Sensors (Switzerland)* 2017, 17, 1726.
(53) Anker, J. N.; Hall, W. P.; Lyandres, O.; Shah, N. C.; Zhao, J.; Van Duyne, R. P. Biosensing with Plasmonic Nanosensors. *Nat. Mater.* 2008, 7, 442-453.
(54) King, N. S.; Liu, L.; Yang, X.; Cerjan, B.; Everitt, H. O.; Nordlander, P.; Halas, N. J. Fano Resonant Aluminum Nanoclusters for Plasmonic Colorimetric Sensing. *ACS Nano* 2015, 9, 10628-10636.
(55) Wu, D. M.; Solomon, M. L.; Naik, G. V.; García-Etxarri, A.; Lawrence, M.; Salleo, A.; Dionne, J. A. Chemically Responsive Elastomers Exhibiting Unity-Order Refractive Index Modulation. *Adv. Mater.* 2018, 30, 1703912.
(56) Tittl, A.; Leitis, A.; Liu, M.; Yesilkoy, F.; Choi, D.-Y.; Neshev, D. N.; Kivshar, Y. S.; Altug, H. Imaging-Based Molecular Barcoding with Pixelated Dielectric Metasurfaces. *Science* 2018, 360, 1105-1109.
(57) Limonov, M. F.; Rybin, M. V.; Poddubny, A. N.; Kivshar, Y. S. Fano Resonances in Photonics. *Nat. Photonics* 2017, 11, 543-554.
(58) Lawrence, M.; Barton, D. R.; Dionne, J. A. Nonreciprocal Flat Optics with Silicon Metasurfaces. *Nano Lett.* 2018, 18, 1104-1109.
(59) Bolin, F. P.; Preuss, L. E.; Taylor, R. C.; Ference, R. J. Refractive Index of Some Mammalian Tissues Using a Fiber Optic Cladding Method. *Appl. Opt.* 1989, 28, 2297.
(60) Zysk, A. M.; Chaney, E. J.; Boppart, S. A. Refractive Index of Carcinogen-Induced Rat Mammary Tumours. *Phys. Med. Biol.* 2006, 51, 2165-2177.
(61) Musset, A.; Thelen, A. Multilayer Antireflection Coatings. *Prog. Opt.* 1970, 8, 201-237.
(62) Saleh, B. E. A.; Teich, M. C. *Fundamentals of Photonics*; Wiley Series in Pure and Applied Optics; John Wiley & Sons, Inc.: New York, USA, 1991.
(63) Carron, K. T.; Lehmann, H. W.; Fluhr, W.; Meier, M.; Wokaun, A. Resonances of Two-Dimensional Particle Gratings in Surface-Enhanced Raman Scattering. *J. Opt. Soc. Am. B* 1986, 3, 430-440.
(64) Auguié, B.; Barnes, W. L. Collective Resonances in Gold Nanoparticle Arrays. *Phys. Rev. Lett.* 2008, 101, 143902.
(65) Wang, S. S.; Magnusson, R. Theory and Applications of Guided-Mode Resonance Filters. *Appl. Opt.* 1993, 32, 2606-2613.
(66) Ding, Y.; Magnusson, R. Resonant Leaky-Mode Spectral-Band Engineering and Device Applications. *Opt. Express* 2004, 12, 5661-5674.
(67) Wright, W. D. A Re-Determination of the Trichromatic Coefficients of the Spectral Colours. *Trans. Opt Soc.* 1929, 30, 141-164.
(68) Smith, T.; Guild, J. The C.I.E. Colorimetric Standards and Their Use. *Trans. Opt. Soc.* 1931, 33, 73-134.
(69) Lodish, H. F. *Molecular Cell Biology*; W. H. Freeman, 2000.
(70) Schellman, J.; Jensen, H. P. Optical Spectroscopy of Oriented Molecules. *Chem. Rev.* 1987, 87, 1359-1399.
(71) Karsdal, M. A. *Biochemistry of Collagen, Laminins and Elastin*; Elsevier, 2016.
(72) Wallenburg, M. A.; Wood, M. F. G.; Ghosh, N.; Vitkin, I. A. Polarimetry-Based Method to Extract Geometry-Independent Metrics of Tissue Anisotropy. *Opt. Lett.* 2010, 35, 2570-2572.
(73) Sharma, G. *Digital Color Imaging Handbook*; CRC Press, 2003.
(74) Schanda, J.; International Commission on Illumination. *Colorimetry: Understanding the CIE System*; CIE/Commission internationale de l'eclairage, 2007.
(75) Novotny, L.; Hecht, B. *Principles of Nano-Optics*, 2nd ed.; Cambridge University Press: Cambridge, 2012.
(76) Graham, H. K.; Hodson, N. W.; Hoyland, J. A.; Millward-Sadler, S. J.; Garrod, D.; Scothern, A.; Griffiths, C. E. M.; Watson, R. E. B.; Cox, T. R.; Erler, J. T.; Trafford, A. W.; Sherratt, M. J. Tissue Section AFM: In Situ Ultrastructural Imaging of Native Biomolecules. *Matrix Biol.* 2010, 29, 254-260.
(77) Collett, E. *Field Guide to Polarization*; SPIE, 2005.

(78) Conklin, M. W.; Eickhoff, J. C.; Riching, K. M.; Pehlke, C. A.; Eliceiri, K. W.; Provenzano, P. P.; Friedl, A.; Keely, P. J. Aligned Collagen Is a Prognostic Signature for Survival in Human Breast Carcinoma. *AJPA* 2011, 178, 1221-1232.

(79) Michel-Lévy, A.; Lacroix, A. *Les Minéraux Des Roches*; Librarie Polytechnique: Paris, 1888.

(80) Plum, E.; Fedotov, V. A.; Zheludev, N. I. Extrinsic Electromagnetic Chirality in Metamaterials. *J. Opt. A Pure Appl. Opt.* 2009, 11, 074009.

The invention claimed is:

1. A metasurface optical device comprising:
   a first layer composed of a first dielectric material, a second layer composed of a second dielectric material, and a third layer composed of a third dielectric material;
   wherein the first layer, the second layer, and the third layer are stacked to form an anti-reflective structure for wavelengths in a predetermined operational wavelength range within the visible spectrum;
   wherein the anti-reflective structure contains a rectangular lattice of rhombohedral perturbations that produce guided-mode resonances within the predetermined operational wavelength range;
   wherein each of the rhombohedral perturbations breaks reflection and/or rotation symmetry sufficient to induce at least a 10% difference in a colorimetric response of the metasurface optical device within the predetermined operational wavelength range within the visible spectrum compared to a colorimetric response of a device with symmetric perturbations.

2. The metasurface optical device of claim 1 wherein each of the rhombohedral perturbations has a size less than wavelengths in the predetermined operational wavelength range.

3. The metasurface optical device of claim 1 wherein the rectangular lattice of rhombohedral perturbations has lattice periodicity less than wavelengths in the predetermined operational wavelength range.

4. The metasurface optical device of claim 1 wherein the guided-mode resonances have sub-10 nm bandwidth within the predetermined operational wavelength range.

5. The metasurface optical device of claim 1 wherein the first dielectric material has a first refractive index, the second dielectric material has a second refractive index, and the third dielectric material has a third refractive index.

6. The metasurface optical device of claim 1 wherein the second refractive index is larger than the first refractive index and larger than the third refractive index.

7. The metasurface optical device of claim 1 wherein the first dielectric material, the second dielectric material, and the third dielectric material each have negligible loss within the predetermined operational wavelength range.

8. The metasurface optical device of claim 1 wherein the anti-reflective structure has a substantially flat spectral background for wavelengths in a predetermined operational wavelength range of the metasurface optical device.

9. The metasurface optical device of claim 1 wherein the second layer and the third layer each have a thickness less than 1 µm.

10. The metasurface optical device of claim 1 wherein the predetermined operational wavelength range is within the visible spectrum.

11. The metasurface optical device of claim 1 wherein the first layer is a silicon dioxide ($SiO_2$) substrate.

12. The metasurface optical device of claim 1 wherein the second dielectric material is silicon nitride ($Si_3N_4$) or titanium dioxide ($TiO_2$).

13. The metasurface optical device of claim 1 wherein the third dielectric material is silicon dioxide ($SiO_2$).

* * * * *